United States Patent [19]

Kobayashi et al.

[11] Patent Number: 4,568,799
[45] Date of Patent: Feb. 4, 1986

[54] GRAPHIC INPUT DEVICE

[75] Inventors: Tadashi Kobayashi; Yoshihiko Miyazaki, both of Tokyo, Japan

[73] Assignee: NEC Corporation, Tokyo, Japan

[21] Appl. No.: 654,803

[22] Filed: Sep. 25, 1984

[30] Foreign Application Priority Data

Sep. 30, 1983 [JP] Japan ................................. 58-183442
Oct. 13, 1983 [JP] Japan ................................. 58-191507
Dec. 28, 1983 [JP] Japan ................................. 58-247052
Jun. 22, 1984 [JP] Japan ................................. 59-128728

[51] Int. Cl.$^4$ ............................................. G08C 21/00
[52] U.S. Cl. ........................................ 178/18; 178/19
[58] Field of Search .................... 178/18, 19; 364/571, 364/556

[56] References Cited

U.S. PATENT DOCUMENTS 3,873,770 3/1975 Ioannou .............................. 178/18
4,477,877 10/1984 Nakamura et al. .................. 178/18

Primary Examiner—Stafford D. Schreyer
Attorney, Agent, or Firm—Laff, Whitesel, Conte & Saret

[57] ABSTRACT

A graphic input device for converting a character, a diagram or like pattern entered by hand to an electric signal. A pen for entering the pattern has a winding therein which is fixed in a predetermined position which is not close to the tip of the pen. This allows a minimum of error due to inclination of the pen to be introduced into a value which is indicated by a coordinate signal when the pattern is entered.

23 Claims, 30 Drawing Figures

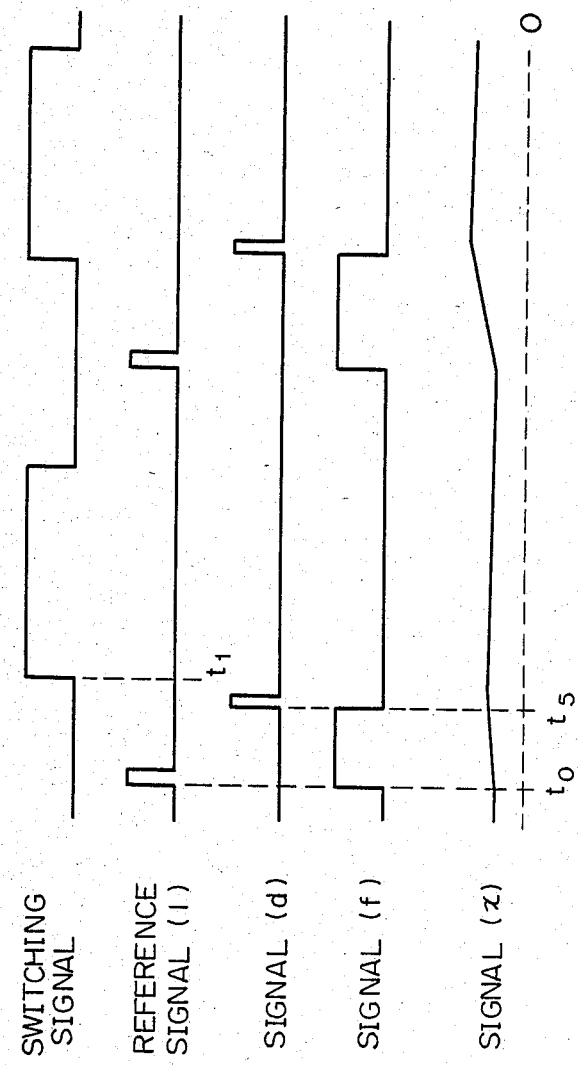

GRAPHIC INPUT DEVICE

BACKGROUND OF THE INVENTION

The present invention relates to a graphic input device.

Means for converting characters, drawings and other patterns entered, or written, by hand has customarily been implemented by a graphic input device in which a position of a pen on an input or writing surface of a tablet is detected electromagnetically to generate a coodinate signal indicative of coordinates of the pen position. The tablet is provided with two orthogonal groups of conductive loops in the input surface, while the pen for writing information is provided with a winding therein. When information is written on the input surface of the tablet, the electromagnetic coupling point between the pen and the winding is detected to generate a coordinate signal indicative of the pen position in terms of coordinates.

Referring to FIG. 1, a prior art graphic input device includes a tablet 1 having an input surface on which two groups of conductive loops 10 and 11 are arranged orthogonally to each other. A pen 5 has a winding 6 fixed in place thereinside. A control circuit 4 delivers a timing signal and a carrier signal to scanning circuits 3 and 2. In response to the input signals, the scanning circuits 3 and 2 deliver to the loops 10 and 11, respectively, multi-phase burst signals which are multi-phase pulse signals modulated by the carrier. When the multi-phase burst signal is applied to the loop 10 (or 11), a magnetic field develops on the input surface of the tablet 1 and propagates at a predetermined rate along the horizontal or X coordinate axis (or vertical or Y coordinate axis). As information is entered, or written, by hand on the tablet surface, the winding 6 inside the pen 5 is interlinked with the propagating magnetic field with the result that a voltage complementary to a change in field intensity is induced across the opposite ends of the winding 6.

The voltage induced by the winding 6 is amplified by an amplifier 7 the output of which is in turn applied to a detector 8. The detector 8 comprises an envelope detector including a diode and serves to detect an envelope of the output signal of the amplifier 7. A coordinate detector circuit 9, supplied with the detected signal from the detector 8, detects a phase of the detected signal to generate a coordinate signal which indicates an X coordinate (or Y coordinate) of the position of the pen 5 on the tablet 1. As shown, the coordinate detector circuit 9 is made up of a filter 91, a phase detector 92 and a coordinate generator 93. The filter 91 separates from the detected signal a fundamental harmonic component which is a sinusoidal component having the same period as the previously mentioned multi-phase pulse signal. The phase detector 92 to which the fundamental harmonic component is applied serves to generate a pulse which rises when the phase angle of the fundamental harmonic component is brought to a predetermined value (e.g. a phase in which the amplitude crosses zero from the negative toward the positive), the pulse being routed to the coordinate generator 93. The coordinate generator 93 generates a digital signal indicative of an interval between the rise time of the pulse output from the phase detector 92 and that of a reference pulse output from the control circuit 4. The reference pulse rises at a timing which indicates the origin of the X coordinate or that of the Y coordinate. The digital signal from the coordinate generator 93 is fed out as a coordinates signal. Since the interval from the rise of the reference pulse to the rise of the pulse output from the phase detector 92 is proportional to the value of the X or Y coordinate of the pen position, the coordinate signal represents a digital value proportional to the X or Y coordinate of the pen position.

The problem encountered with such a prior art graphic input device is that error is introduced into a value indicated by the coordinate signal depending upon the inclination of the pen 5 during input operation, as will be described.

Referring to FIGS. 2A and 2B, the pen 5 is shown in two different positions relative to the input surface of the tablet 1. The pen 5 is shown in FIG. 2A with its axis perpendicular to the input surface and, in FIG. 2B, with the axis inclined an angle $\theta$ relative to a line vertical to the input surface. The winding 6 in the pen 5 is positioned at a predetermined distance, or height, h from the pen tip and has an interlinkage surface with the magnetic field which is perpendicular to the axis of the pen 5. Where informtion is written with the pen 5 held upright as in FIG. 2A, the winding 6 is interlinked solely with the vertical component of the propagating field at a position which shares the same coordinate as the pen tip and at the height h above the input surface. Meanwhile, where the pen 5 is inclined as shown in FIG. 2B, the winding 6 is interlinked with both the vertical and horizontal components of the propagating magnetic field at a coordinate which is deviated by a complementary amount to the inclination.

The inclination of the pen 5 shown in FIGS. 2A and 2B effects detection of coordinates as represented by waveforms in FIG. 3. The dotted waveforms in FIG. 3 represent signals provided by the pen 5 in the upright position shown in FIG. 2A, while the solid waveforms represent signals provided by the pen 5 in the inclined position shown in FIG. 2B. Here, the tip of the pen 5 is located at the same coordinates. The detected signal is the signal output from the detector 8 shown in FIG. 1. The zero-phase component and the orthogonal component are set up by decomposing the detected signal into two orthogonal components. As shown, the waveform of the zero-phase component is symmetrical with respect to a positive peak of the detected signal, while that of the orthogonal component is inverse with respect to the same. Stated another way, assuming that a positive peak of the detected signal indicates a time at which the phase angle is zero, the zero phase component is a cosine series component of the detected signal and the orthogonal component, a sine series component. The detected signal is the sum of the zero phase component and the orthogonal component. The fundamental harmonic component is that of the detected signal and, therefore, equal to the sum of the fundamental harmonic components of the zero phase and orthogonal components.

A detected signal Do obtained with the pen 5 held in the upright position has a waveform which becomes symmetrical with respect to a peak of the amplitude at every scanning period. When decomposed into two components, the detected signal Do is made up of a zero phase component Po which is equal to the signal Do and an orthogonal component which is zero. Therefore, the fundamental harmonic component Fo has a cosine waveform which reaches a positive peak when the amplitude of the signal Do is at a peak.

On the other hand, where the pen 5 is inclined, a detected signal $D\theta$ appears with a lag relative to the signal Do and loses symmetry, due to a lag originating from the previously described deviation in coordinate between the winding 6 and the pen tip and the interlinkage of the winding 6 with the horizontal component of the propagating magnetic field. A zero phase component $P\theta$, provided by decomposing the signal $D\theta$, reaches a peak at a time $t_n$ (or $t_{n+1}$) which is deviated from the peak of the zero phase component Po. Also, an orthogonal component $Q\theta$ appears due to the asymmetry of the waveform of the detected signal $D\theta$. The waveform of the orthogonal component $Q\theta$ is an alternating waveform which inverts from the negative to the positive just before the time $t_n$ (or $t_{n+1}$) and, therefore, the primary Fourier coefficient of its sine series is very small and almost zero. It follows that the fundamental harmonic component $F\theta$ has a cosine waveform substantially common in phase with the fundamental harmonic component of the zero phase component $P\theta$, i.e. cosine waveform having a peak at the time $t_n$ (or $t_{n+1}$).

The filter 91 shown in FIG. 1 separates the fundamental harmonic component of FIG. 3 and delivers it to the phase detector 92. Upon receipt of the fundamental harmonic component Fo, the phase detector 92 generates a pulse which rises at a time $\tau_0$ and, upon receipt of the fundamental harmonic component $F\theta$, a pulse which rises at a time $\tau\theta$. The time $\tau\theta$ is deviated from the time $\tau_0$ by an amount substantially complementary to the time lag which orginates from the inclination of the pen 5. Therefore, although the tip of the pen 5 may remain in the same position, any change in the inclination of the pen 5 introduces error into a value indicated by the coordinate signal.

The relationship between an angle of inclination $\theta$ of the pen 5 and a coordinate deviation d is shown in FIG. 4. The coordinate deviation d implies a deviation of a value indicated by the coordinate signal which resulted from a change in the angle $\theta$ for the same position of the pen tip on the input surface. A solid line 12 pertains to a case wherein the winding 6 is at a small height h and mounted in the pen 5 adjacent to the tip, while a dotted line 13 pertains to a case wherein the winding 6 is located higher than the winding associated with the solid line 12. As shown in FIG. 4, the primary requisite for the coordinate deviation d to be reduced is that the winding 6 be located as near to the pen tip as possible.

FIG. 5 is a side elevation showing an exemplary structure of the pen 5. Since the winding 6 is located close to the tip 51 of the pen 5 for the reason described above, the outside diameter of the pen 5 cannot be decreased in its portion which accommodates the winding 6. This does not allow the operator to see the pen tip 51 and, thereby, makes it difficult to enter fine and/or complicated patterns.

SUMMARY OF THE INVENTION

It is therefore an object of the present invention to provide a graphic input device which eliminates the drawback discussed above.

It is another object of the present invention to provide a graphic input device which allows a minimum of deviation to develop in the value indicated by the coordinate signal even if the position of a winding in a pen is not extremely close to the tip of the pen.

It is another object of the present invention to provide a generally improved graphic input device.

In one aspect of the present invention, there is provided a graphic input device for converting a pattern entered by hand to an electric signal, comprising a drive circuit for generating a drive signal by modulating a multi-phase signal by a carrier signal, a tablet having an input surface in which a plurality of conductive loops are arranged to generate in response to the drive signal a magnetic field which propagates along a coordinate axis, a pen for entering the pattern having a winding which is mounted in the pen at a predetermined height above a tip of the pen, the winding being interlinked with the magnetic field to generate a voltage signal when the pattern is entered into the input surface of the tablet, a demodulator for generating a demodulated signal by synchronously detecting the voltage signal by means of a carrier signal for demodulation which is synchronous in phase with the carrier signal contained in the voltage signal and, then, clipping the detected voltage signal at a predetermined voltage level, and a coordinate detector for generating a coordinate signal indicative of an input coordinate where the pen is positioned in response to a fundamental harmonic component of the demodulated signal.

In another aspect of the present invention, there is provided a graphic input device for converting a pattern entered by hand to an electric signal, comprising an oscillator for generating a carrier, a pen for entering the pattern having a winding which is mounted in the pen at a predetermined height above a tip of the pen, the winding developing a magnetic field in response to the carrier, a tablet having an input surface in which a plurality of conductive loops are arranged, each of the conductive loops being interlinked with the magnetic field to generate a voltage signal during an input operation, a scanning circuit for generating a scanned signal by sequentially scanning the voltage signals generated by the conductive loops, a demodulator for generating a demodulated signal by synchronously detecting the scanned signal by a carrier for demodulation which is synchronous in phase with the carrier contained in the scanned signal and, then, clipping the detected signal at a predetermined voltage level, and a coordinate detector for generating a coordinate signal indicative of an input coordinate where the pen is positioned in response to a fundamental harmonic component of the demodulated signal.

In another aspect of the present invention, there is provided a graphic input device for converting a pattern entered by hand to an electric signal, comprising a tablet having an input surface in which a first group of a plurality of conductive loops and a second group of a plurality of conductive loops are arranged in a first coordinate direction and a second coordinate direction, respectively, a pen for entering the pattern having a winding which electromagnetically couples with the first and second groups of loops in the input surface during an input operation, an input circuit having scanning circuits for scanning respectively the first and second groups of loops each with a predetermined period, a first filter for filtering a first electric signal indicative of a point of electromagnetic coupling of the first group of loops and the winding, a second filter for filtering a second electric signal indicative of a point of electromagnetic coupling of the second group of loops and the winding, at least one switch for alternately selecting two terminals of at least one of a set of input terminals and a set of output terminals of the first and second filters in response to a switching signal which is synchronous with the scanning period, and a detector having a coordinate detector circuit for generating a third electric signal indicative of an input coordinate where the pen is positioned in response to the first and second electric signals which are filtered respectively by the first and second filters alternately selected by the switch.

In another aspect of the present invention, there is provided a graphic input device for converting a pattern entered by hand to an electric signal, comprising, a tablet having an input surface in which a first loop group and a second loop group each comprising a plurality of conductive loops are arranged in first and second coordinate directions, respectively, a pen for entering the pattern having a winding which electromagnetically couples with the first and second loop groups in the input surface during an input operation, an input circuit having scanning circuits for scanning respectively the first and second loop groups each at a predetermined period, a first filter for filtering a first electric signal indicative of a point of electromagnetic coupling of the first loop group and the winding, a second filter for filtering a second electric signal indicative of electromagnetic coupling of the second loop group and the winding, and a detector having a coordinate detector circuit for generating a third electric signal indicative of input coordinates where the pen is positioned in response to the first and second electric signals which are filtered by the first and second filters, respectively.

In another aspect of the present invention, there is provided a graphic input device for converting a pattern entered by hand to an electric signal, comprising, a tablet for graphic input, a coordinate detector for generating a first signal in a phase which indicates a reference point of a coordinate on an input surface of the tablet, and a second signal different in phase from the first electric signal by an amount substantially proportional to a coordinate distance between the reference point and an input position on the input surface, and a coordinate signal generator for generating an analog signal of a voltage substantially proportional to the phase difference between the first and second signals in response to the first and second signals.

In another aspect of the present invention, there is provided a graphic input device for converting a pattern entered by hand to an electric signal, comprising, a tablet for developing a magnetic field propagating along a coordinate axis on an input surface of the tablet in response to a scanning signal which is modulated by a carrier to alternately scan two groups of conductive loops arranged in the input surface, a pen having a winding therein which is interlinked with the magnetic field upon entry of the pattern into the input surface so as to induce a first electric signal, a filter amplifier for passing and amplifying a component of the first electric signal which lies in a predetermined bandwidth inclusive of a frequency of the carrier, a detector for detecting the filtered and amplified electric signal, a peak detector for detecting a peak of a waveform of the detected electric signal to generate a second electric signal indicative of a time of appearance of the peak, whereby a coordinate signal indicative of a coordinate of the input point is delivered in response to a lag between a pulse signal indicative of a time associated with an origin of the coordinate and the second electric signal.

In another aspect of the present invention, there is provided a graphic input device for converting a pattern entered by hand to an electric signal, comprising, a pen having a winding therein which develops a magnetic field in response to a carrier applied thereto, a tablet having an input surface in which two groups of conductive loops are arranged, the tablet, when the pattern is entered into the input surface, alternately scanning electric signals which are induced in the respective loop groups in response to the magnetic field and, thereby, generating a first electric signal, a filter amplifier for passing and amplifying a component of the first electric signal which lies in a predetermined bandwidth inclusive of a frequency of the carrier, a detector for detecting the filtered and amplified electric signal, and a peak detector for detecting a peak of the waveform of the detected electric signal to generate a second electric signal which indicates a time of detection of the peak, whereby a coordinate signal indicative of a coordinate of the input point is generated in response to a difference in time between a pulse signal indicative of a time associated with an origin of the coordinate and the second electric signal.

The above and other objects, features and advantages of the present invention will become apparent from the following detailed description taken with the accompanying drawings.

BRIEF DESCRIPTION OF THE DRAWINGS

FIG. 23 shows waveforms demonstrating the operation of the tenth embodiment shown in FIG. 22;

DESCRIPTION OF THE PREFERRED EMBODIMENTS

Figure 1:
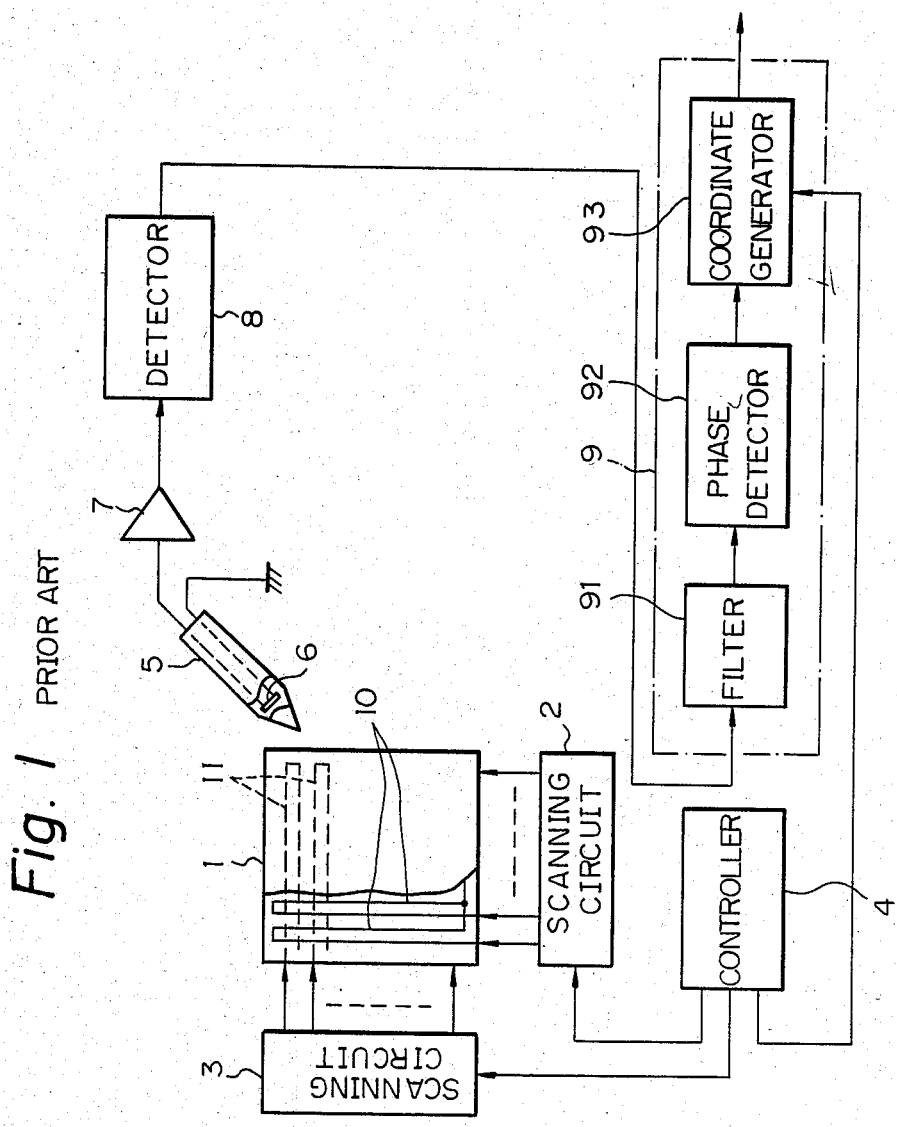
FIG. 1 is a block diagram of a prior art graphic input device.
Figure 2A:
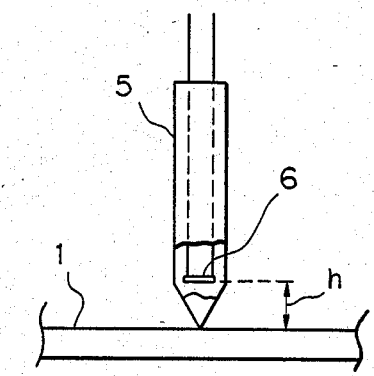
FIGS. 2A and 2B show inclination of a pen included in the graphic input device shown in FIG. 1.
Figure 2B:
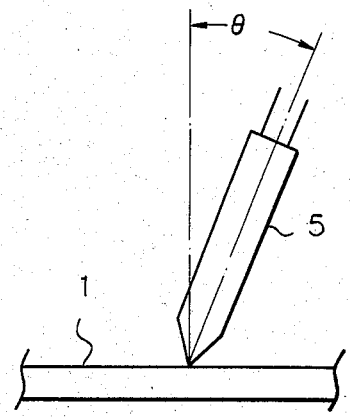
Figure 3:
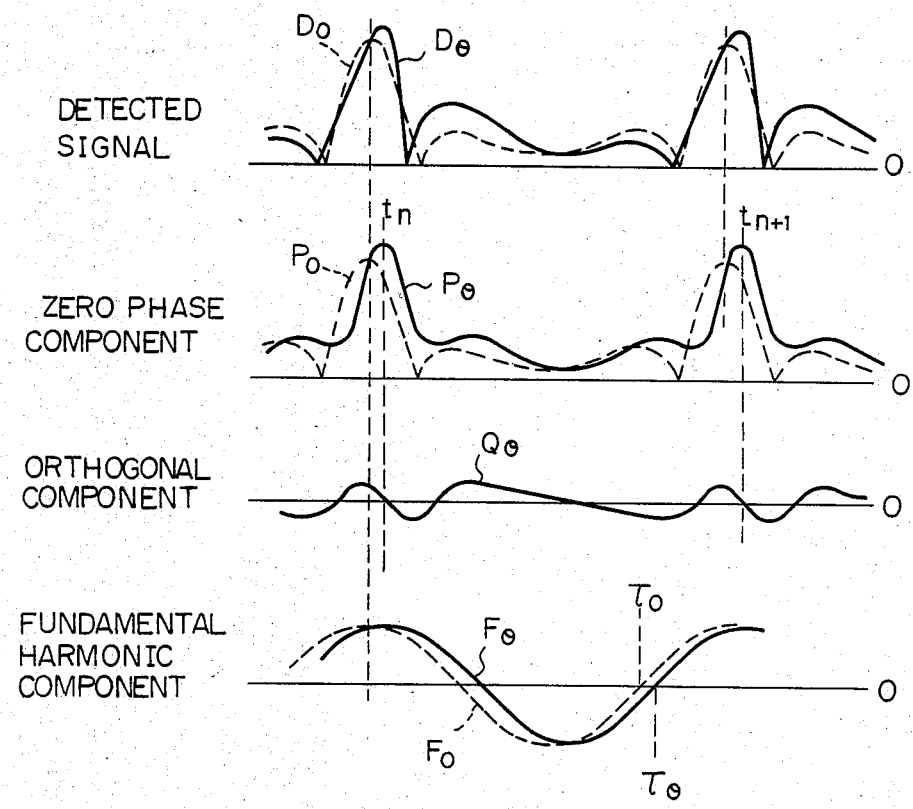
FIG. 3 shows waveforms representative of the operation of the prior art device shown in FIG. 1.
Figure 4:
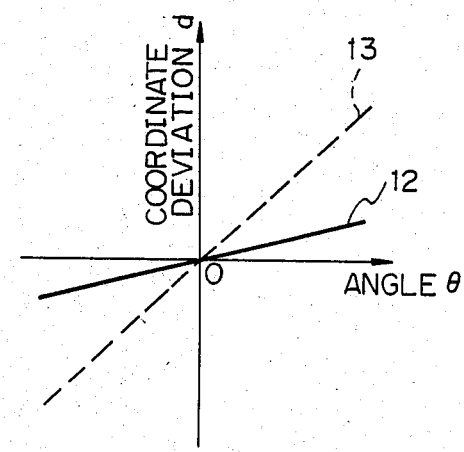
FIG. 4 shows a relationship between an angle of inclination $\theta$ and a coordinate deviation d particular to the prior art device.
Figure 5:
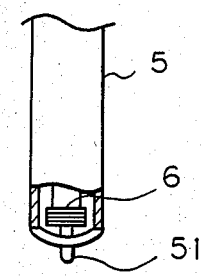
FIG. 5 is a partly taken away side elevation of an exemplary structure of the pen included in the prior art device.

While the graphic input device of the present invention is susceptible of numerous physical embodiments, depending upon the environment and requirements of use, substantial numbers of the herein shown and described embodiments have been made, tested and used, and all have performed in an eminently satisfactory manner.

Reference will be made to FIGS. 6-28 for describing various embodiments of the graphic input device of the present invention in detail. The same or similar structural elements are designated by like reference numerals throughout FIGS. 6-28.

Figure 6:
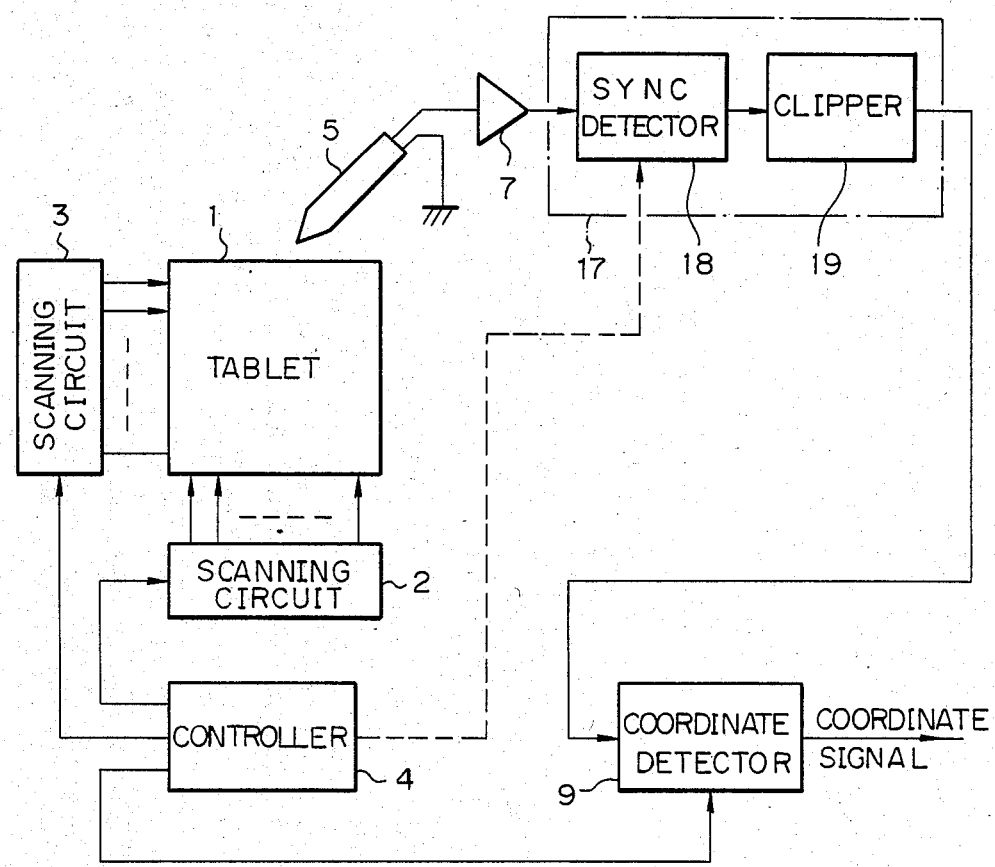
FIG. 6 is a block diagram showing a first embodiment of a graphic input device of the present invention.

Referring to FIG. 6, a graphic input device in accordance with the first embodiment of the present invention includes scanning circuits 2 and 3 each of which generates a drive signal by modulating a multi-phase signal by a carrier signal. A tablet 1 has an input or writing surface in which a plurality of conductive loops are arranged for generating a magnetic field in response to the drive signal. The magnetic field propagates along a coodinate axis. A pen 5 for entering desired information has therein a winding (not shown) which is located at a predetermined distance, or height, from the tip of the pen 5 so as to be interlinked with the magnetic field to generate a voltage signal while information is entered into the tablet surface. A demodulator circuit 17 synchronously detects the voltage signal by a carrier signal for demodulation, which is synchronous with the carrier signal contained in the voltage signal, and then generates a demodulated signal which has been clipped with respect to a predetermined voltage level. Further, a coordinate detector 9 generates a coordinate signal indicative of an input coordinate of the pen 5 in response to a fundamental harmonic component of the demodulated signal.

In the illustrative embodiment, the detector 8 of the prior art device shown in FIG. 1 is replaced by the demodulator 17 which is made up of a synchronous detector 18 and a clipper 19. The synchronous detector 18 functions to generate a product signal of a signal fed thereto from an amplifier 7 and a carrier signal for detection which is the same in phase as a carrier component contained in the signal from the amplifier 7, delivering a low frequency component of the product signal as a detected signal. In this case, the carrier signal for detection may be generated by synchronizing in phase the signal output from the amplifier 7 with a carrier signal which is generated by a control circuit 4 and then passed through a phase shifter or, alternatively, by routing the signal output from amplifier 7 through a phase synchronizing circuit. The clipper 19 serves to remove a portion of the detected signal which is lower than a predetermined voltage level.

Figure 7:
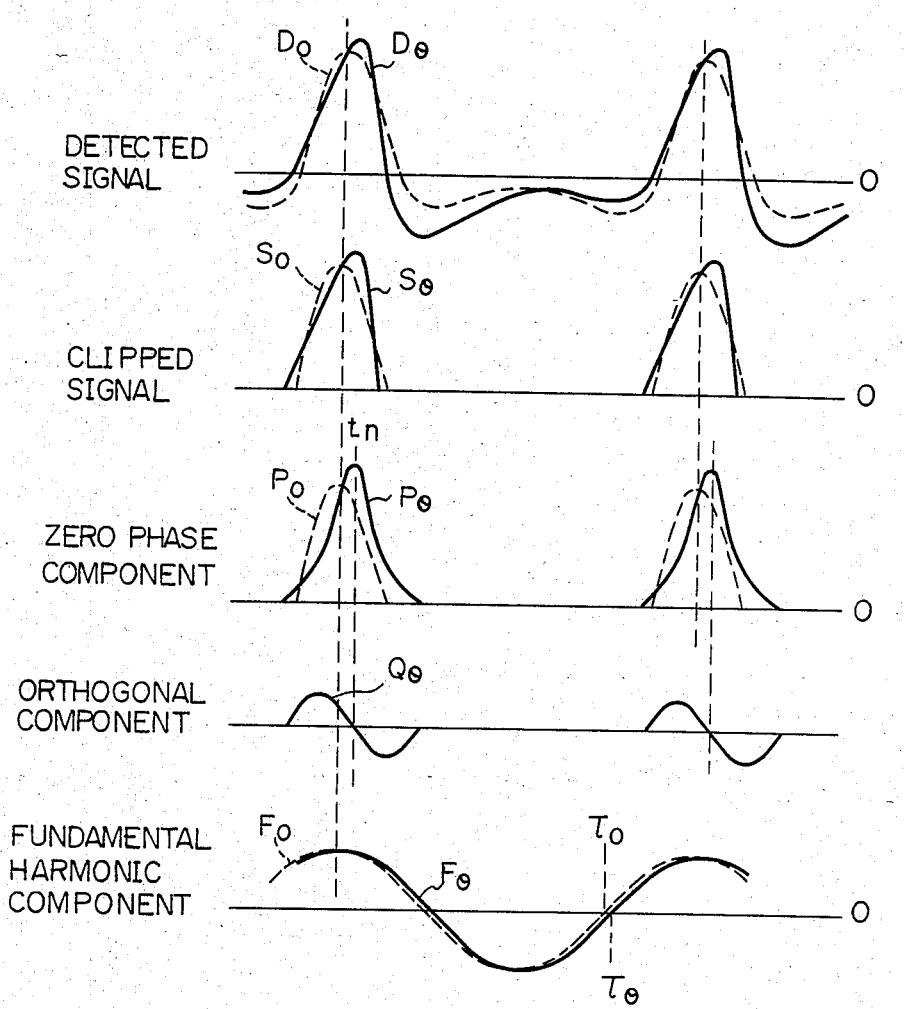
FIG. 7 shows waveforms representative of the operation of the first embodiment of the present invention shown in FIG. 6.

The operation of the graphic input device shown in FIG. 6 will be described with reference to FIG. 7. In FIG. 7, dotted lines represent various signals associated with the upright position of the pen 5 and solid lines, those associated with the inclined position of the same. In either case, the tip of the pen 5 is located at the same coordinates. A detected signal, which is an output of the synchronous detector 18, has a waveform in which positive and negative amplitudes provided by synchronous detection alternate with each other, instead of the envelope waveform on the positive side as in the conventional envelope detection. The clipped signal is an output of the clipper 19 and, in this particular embodiment, produced by removing those portions of the detected signal lower than the zero voltage (i.e. negative voltages). The zero phase signal and the orthogonal signal respectively are the cosine component and the sine component of the clipped signal. Further, the fundamental harmonic component is that of the clipped signal and equal to the sum of the fundamental harmonic components of the zero phase component and orthogonal component.

As shown in FIG. 7, where the pen 5 is held upright, both the detected signal Do and the clipped signal So become symmetrical with respect to a peak at every scanning period, while the orthogonal component is zero. Therefore, the fundamental harmonic component. Fo has a cosine waveform which reaches a positive peak in synchronism with the clipped signal So.

Meanwhile, the clipped signal $S\theta$ resulting from inclination of the pen 5 appears with a lag relative to the clipped signal So and loses symmetry. It follows that the time $t_n$ (or $T_{n+1}$) when the zero phase component $P\theta$ reaches a peak is offset from the peak of the zero phase component Po. Although an orthogonal component $Q\theta$ appears due to the asymmetry of the waveform, the sign, unlike the prior art envelope detection, does not invert just before the time $t_n$ (or $t_{n+1}$). That is, the waveform of the orthogonal component $Q\theta$ is positive just before that time and, for this reason, the linear Fourier coefficient of its sine series does not become zero. This means that the amplitude of the fundamental harmonic component of the orthogonal component $Q\theta$ does not become zero and, yet, when added to the fundamental component of the zero phase component, develops a phase deviation in a direction for cancelling the lag between the zero phase components $P\theta$ and Po. Stated another way, the phase deviation of the fundamental harmonic component $F\theta$ relative to the fundamental harmonic component Fo decreases compared to the lag between the zero phase components $P\theta$ and Po, by an amount complementary to the addition of the orthogonal component $Q\theta$. In accordance with the illustrative embodiment, the height of the winding 6 in the pen 5 is selected such that the difference between the pulse rise times $\tau o$ and $\tau\theta$ generated by the coordinate detector 9 in response to the fundamental harmonic components Fo and $F\theta$, respectively, is minimized, as described hereinafter.

Figure 8:
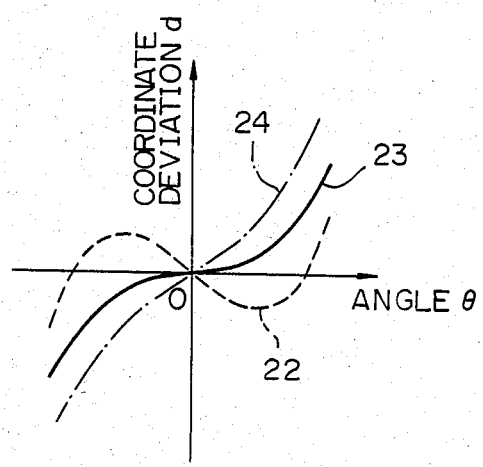
FIG. 8 shows a relationship between an angle of inclination $\theta$ and a coordinate deviation d attainable with the first embodiment shown in FIG. 6.

Referring to FIG. 8, a relationship between an angle of inclination $\theta$ of the pen 5 and a coordinate deviation d in accordance with this particular embodiment is shown. So long as the winding in the pen 5 is positioned at a relatively small height, a characteristic indicated by a dotted line 22 is set up. As the height of the winding is increased, the characteristic sequentially varies as indicated by a solid line 23 or a a dash-and-dot line 24. That is, by suitably selecting the height of the winding, it is possible to achieve a characteristic such as one represented by the solid line 23 wherein the gradient becomes almost zero when the angle $\theta$ is near zero, thereby reducing the deviation of the value indicated by the coordinate signal due to inclination of the pen to substantially zero.

Figure 9:
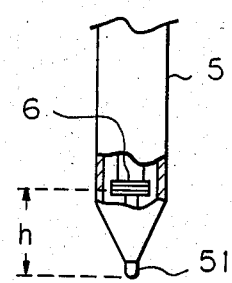
FIG. 9 is a partly taken away side elevation of a pen included in the embodiment FIG. 6.

An exemplary structure of the pen 5 in accordance with the illustrative embodiment is shown in FIG. 9. As already discussed, where the height h of a winding 6 in the pen 5 is selected in such a manner as to minimize the influence of the angle $\theta$ on the deviation d, it is needless to position the winding 6 extremely close to the tip 51 of the pen as has customarily been required. This allows the outside diameter of the pen 5 to be reduced toward the tip 51 so that the operator can enter desired data while seeing the movement of the tip 51 and, therefore, even delicate and complicated patterns can be entered with ease.

As described above, the first embodiment of the present invention is capable of making the influence of the inclination of the pen far smaller than the prior art by performing synchronous detection instead of the conventional envelope detection and, in addition, by clipping the signal waveform. Such is attainable without locating the winding extremely close to the pen tip. While the clipper 19 has been shown and described to remove negative voltages of the detected signal, the construction may be readily modified to remove portions which are lower than any desired voltage other than zero. In any case, since noise superposed on those portions of the detected signal where the voltage level is low during scanning are removed by clipping, the signal-to-noise (SN) ratio of the clipped signal applied to the coordinate detector 9 is far improved over the case with no clipping. Therefore, coordinate detection in accordance with the illustrative embodiment is little susceptive to noise and, hence, accurate.

Figure 10:
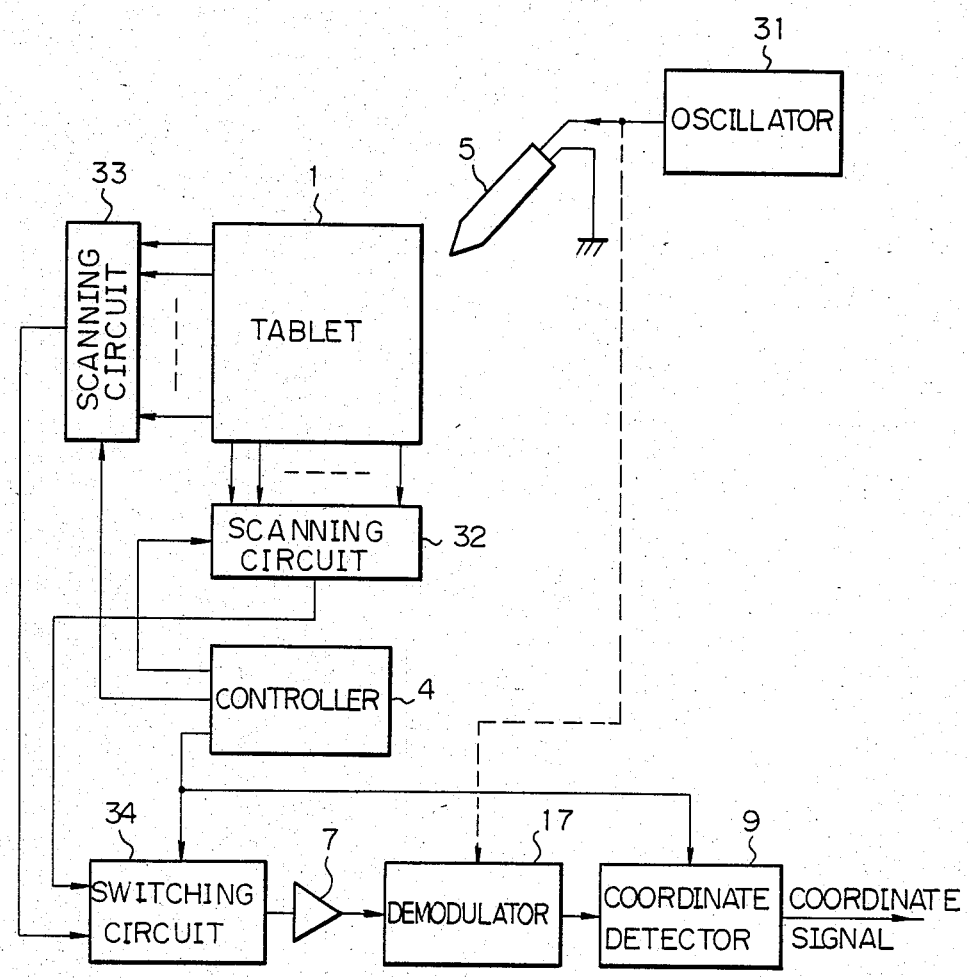
FIG. 10 is a block diagram of a second embodiment of the present invention.

Referring to FIG. 10, a second embodiment of the present invention is shown which includes an oscillator 31 for generating a carrier signal. A pen 5 has therein a winding which is located at a predetermined height above the pen tip to develop a magnetic field in response to the carrier signal. A tablet 1 has an input surface in which a plurality of conductive loops are arranged each to be interlinked with the magnetic field to generate a voltage signal during input operation. Scanning circuits 32 and 33 generate respectively scanned signals by sequentally scanning the voltage signals which are generated by the conductive loops. A demodulator circuit 17 is adapted to synchronously detect the scanned signal by a carrier signal for demodulation, which is synchronous in phase with the carrier contained in the scanned signals, and then generate a demodulated signal by clipping the detected signal with respect to a predetermined voltage level. A coordinate detector 9 generates a coordinate signal indicative of an input coordinate of the pen 5 in responce to a fundamental harmonic component of the demodulated signal.

In the construction shown in FIG. 10, the carrier current output from the oscillator 31 is fed to the winding (not shown) in the pen 5 to develop an alternating magnetic field. Voltages induced in the respective loops (not shown) of the tablet 1 during input operation are sequentially scanned to detect coordinates of an input point, or pen position, on the input surface of the tablet. In response to a timing signal output from a control circuit 4, the scanning circuits 32 and 33 sequentially scan the voltages induced in their associated conductive loops and apply them to a switching circuit 34. The switching circuit 34, responsive to a coordinate switching signal fed thereto from the control circuit 4, switches on a time-sharing basis the signals output from the scanning circuits 33 and 34 alternately at every predetermined period and feeds them to an amplifier 7. The output of the amplifier is synchronously detected and, then, clipped by the demodulator 17, the output of the demodulator 17 being routed to the coordinate detector 9. The clipped signal output from the demodulator 17 has such a waveform as represented by the clipped signal So or S$\theta$ in FIG. 7 in accordance with the inclination of the pen 5. Where the height of the winding in the pen 5 is adequately selected, the coordinate of the pen tip will be detected with accuracy even if the pen 5 is inclined and without the need for locating the winding extremely close to the pen tip.

Figure 11:
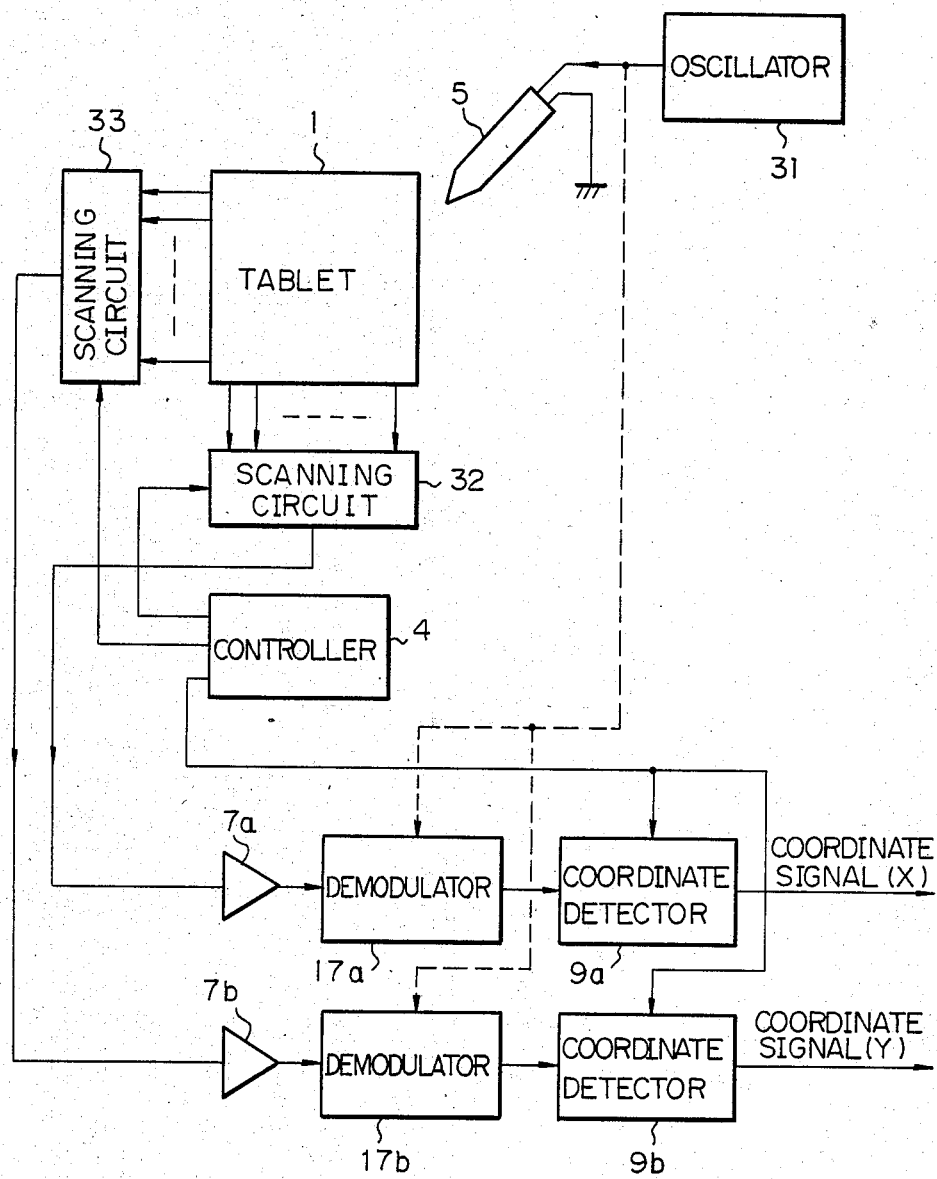
FIG. 11 is a block diagram of a third embodiment of the present invention.

Referring to FIG. 11, a third embodiment of the present invention includes two amplifiers 7a and 7b, two demodulators 17a and 17b, and two coordinate detectors 9a and 9b. In this construction, an X coordinate signal and a Y coordinate signal generated by the scanning circuits 32 and 33, respectively, are applied to the amplifiers 7a and 7b, respectively. Such frees the coordinate signal from the influence of transitional occurrences originating from the time-sharing switching operations, allowing the coordinate signal to constantly indicatean accurate coordinate of a pen position.

Figure 12:
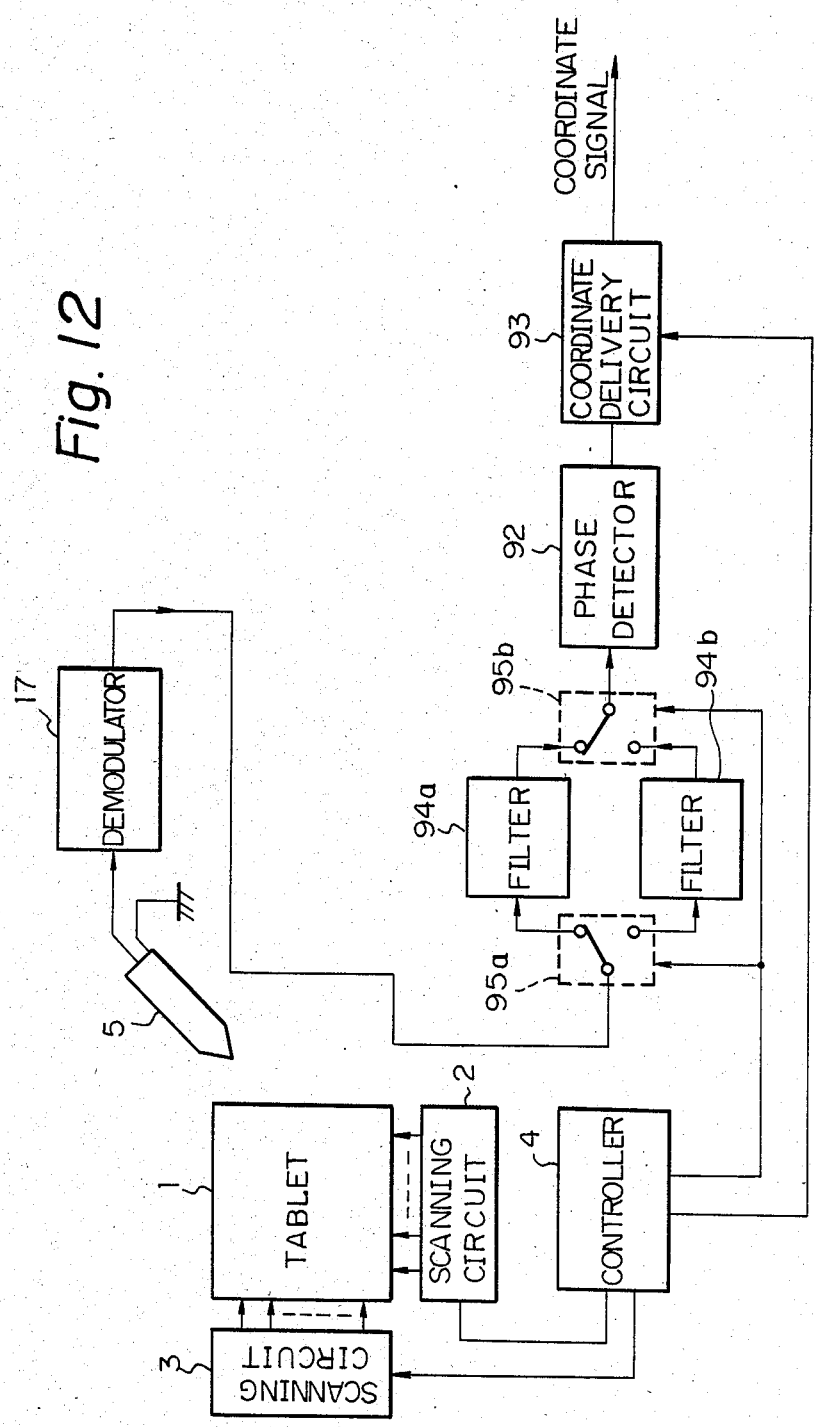
FIG. 12 is a block diagram of a fourth embodiment of the present invention.

Referring to FIG. 12, a fourth embodiment of the present invention is shown. In this particular embodiment, the coordinate detector comprises a first filter 94a for filtering an X coordinate signal output from a demodulator 17, a second filter 94b for filtering a Y coordinate signal, two switches 95a and 95b associated respectively with the input terminals and the output terminals of the filters 94a and 94b so as to alternately select their associated terminals in response to a switching signal, which is applied from a control circuit 4 synchronized with the scanning period of the scanning circuits 2 and 3, a phase detector 92, and a coordinate delivery circuit 93.

Figure 13:
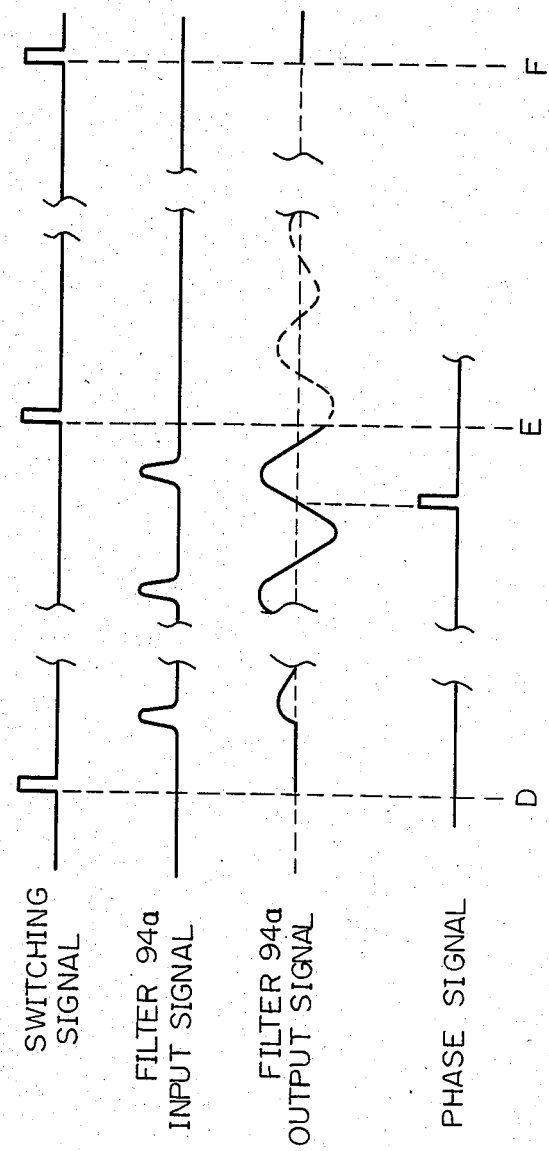
FIG. 13 shows waveforms demonstrating the operation of the fourth embodiment of FIG. 12.

In the construction shown in FIG. 12, each of the switches 95a and 95b selects the filter 94a (or 94b) in response to the switching signal from the controller 4 while the scanning circuit 2 (or 3) is performing X coordinate scanning (or Y coordinate scanning), i.e. from a time D to a time E (or from the time E to a time F) as shown in FIG. 13. That is, from the time D to the time E, the filter 94a receives a detected signal from the demodulator 17 via the switch 95a, then separates a fundamental harmonic component from the detected signal, and then delivers it to the phase detector 92 via the switch 95b. The phase detector 92 supplies the coordinate delivery circuit 93 with a phase signal which rises when the phase angle of the output signal of the filter 94a has reached a predetermined value (e.g. a phase in which the amplitude crosses zero from the negative toward the positive).

Next, from the time E to the time F, the switches 95a and 95b are shifted to the other positions so that the detected signal is routed through the filter 94b. The filter 94b separates the fundamental harmonic component from the incoming signal and sends it to the phase detector 92. Where the filter 94a responsive to a detected signal in the event of X coordinate sanning and the filter 94b response to a detecting signal in the event of Y coordinate scanning are installed independently of each other and switched from one to the other in unison with the scanning direction, as described above, interference between the X signal component and the Y signal component is eliminated to in turn allow the frequency of coordinate detection to be increased per unit time.

Figure 14:
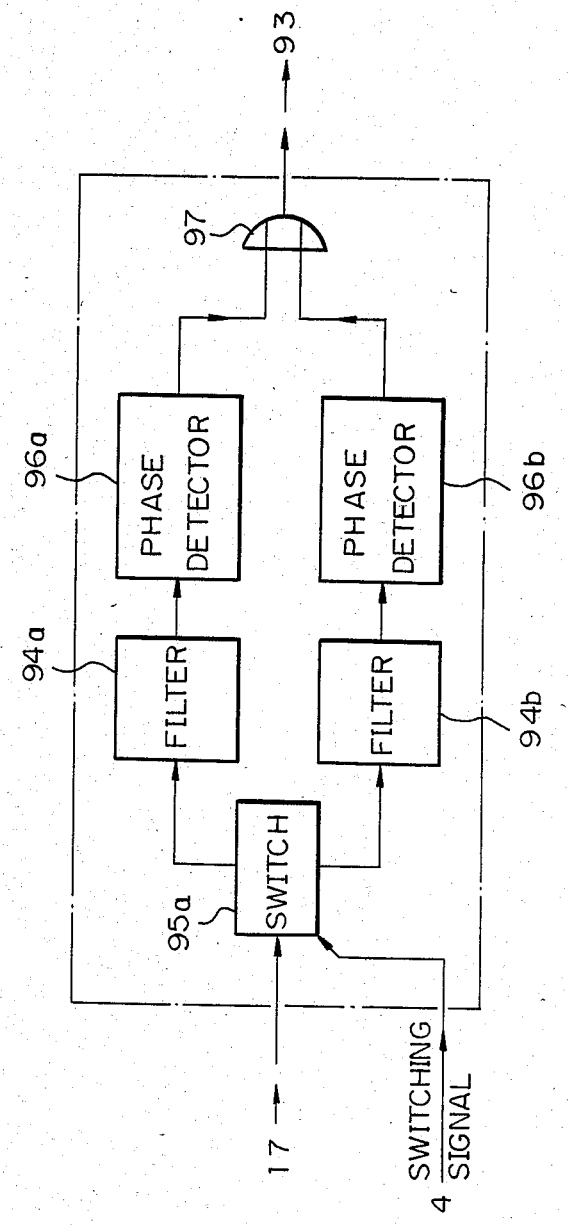
FIG. 14 is a block diagram of a fifth embodiment of the present invention.

Referring to FIG. 14, a fifth embodiment of the present invention comprises a coordinate detector circuit which is made up of a switch 95a, a first filter 94a and a second filter 94b, a first phase detector 96a and a second phase detector 96b, an OR gate 97, and a coordinate delivery circuit 93 (not shown). The filters 94a and 94b connected with the switch 95a have their output terminals connected to the phase detectors 96a and 96b, respectively. The output terminals of the phase detectors 96a and 96b are connected to the coordinate delivery circuit 93 by way of the OR gate 97.

Figure 15:
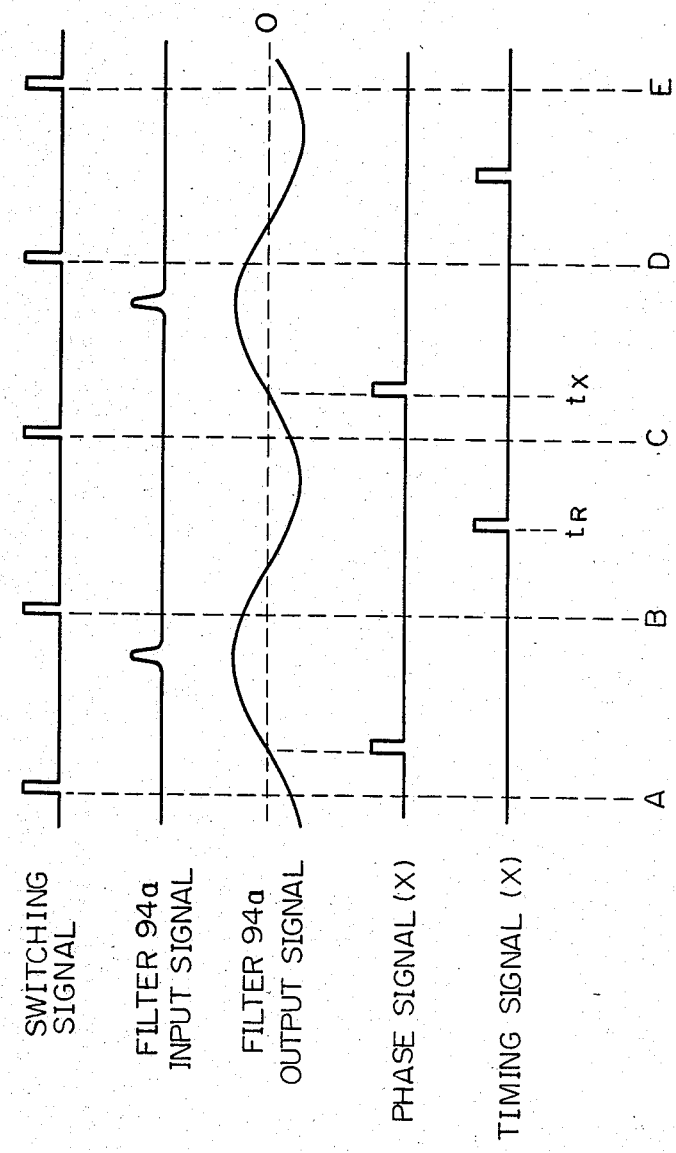
FIG. 15 shows waveforms demonstrating the operation of the fifth embodiment of FIG. 14.

In FIG. 15, X coordinates are scanned between times A and B and between times C and D, while Y coordintes are scanned between times B and C and between times D and E. The frequency of scanning at each coordinate scanning is once. During operation, the signal coming into the filter 94a, for example, rises as a voltage pulse once for each time of X coordinate scanning. The output of the filter, 94a, therefore, has a sinusoidal waveform which reaches a positive peak in unison with the input, while a pulse of the phase signal (X) rises when the phase angle of the sinusoidal waveform reaches a predetermined value, e.g. time tX when the amplitude crosses zero from the negative toward the positive. The coordinate delivery circuit 93 generates a digital coordinate signal proportional to the period of time between a time tR, at which a pulse of a timing signal (X) indicative of the origin of the X coordinates, and the time tX.

Figure 16:
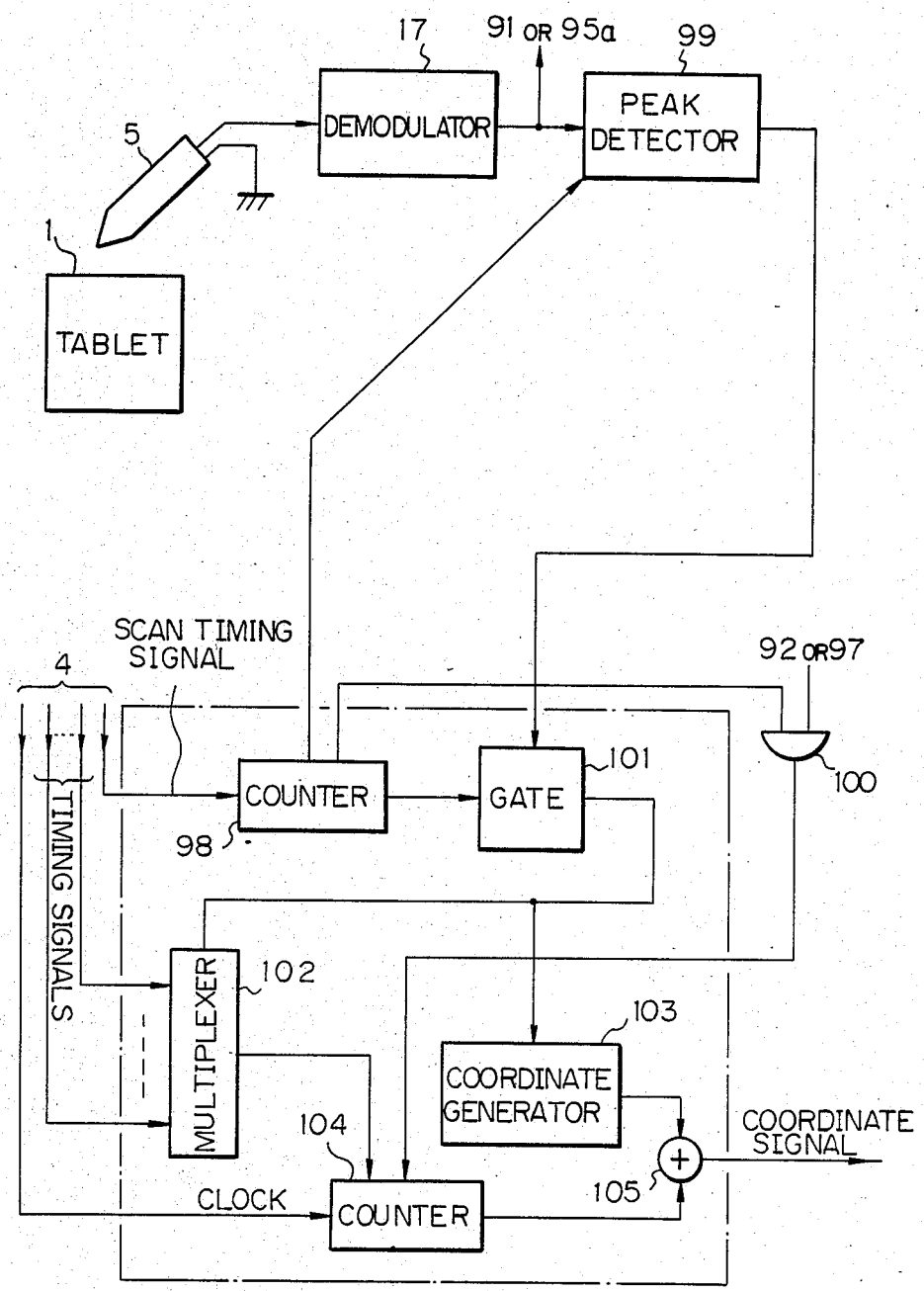
FIG. 16 is a block diagram of a sixth embodiment of the present invention.
Figure 17:
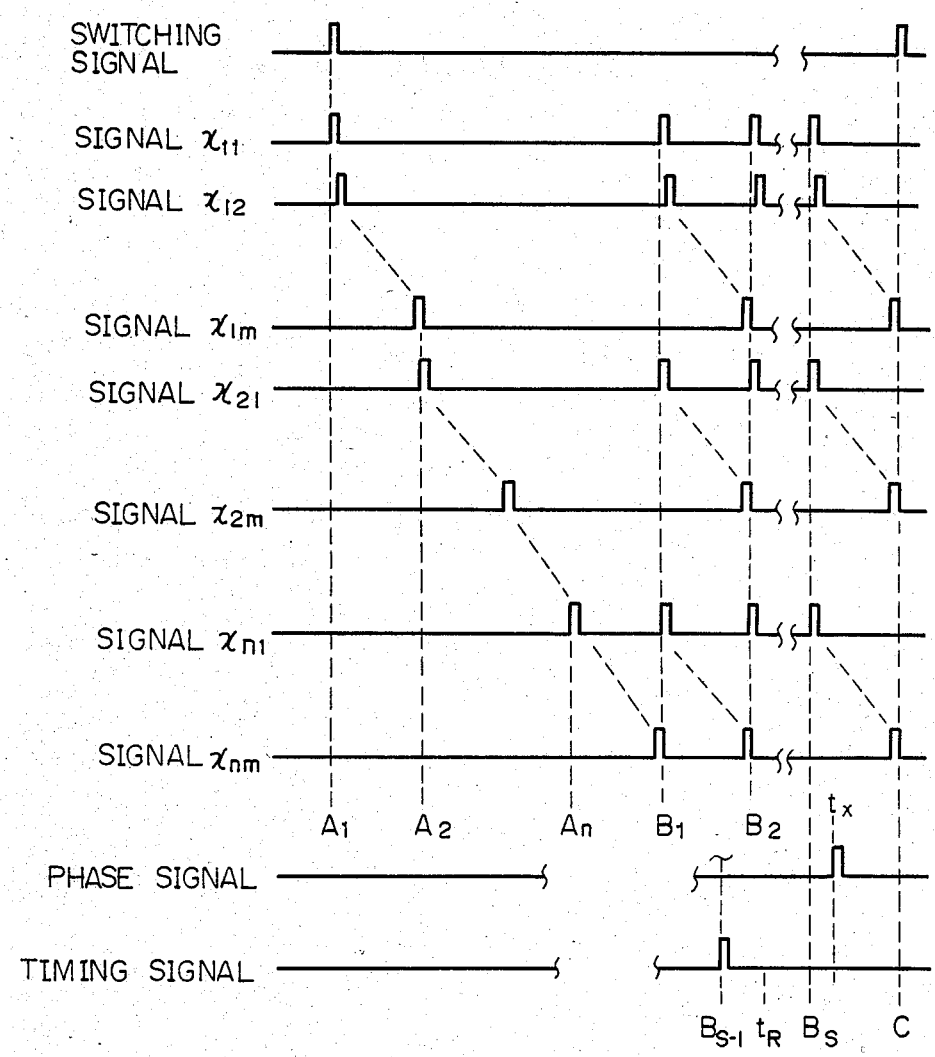
FIG. 17 shows waveforms demonstrating the operation of the sixth embodiment of FIG. 16.

Referring to FIGS. 16 and 17, a sixth embodiment of the present invention is shown in a block diagram and a timing chart, respectively. A characteristic feature of this embodiment is that each of the loops of the tablet 1 is subdivided into a plurality of blocks and a multi-phase burst signal is applied to each of the blocks, with a view to enhancing the resolution in coordinate detection. For example, as shown in FIG. 17, signals $x_{11}$ to $x_{nm}$ which are multi-phase burst signals for X coordinate scanning (only the envelopes are illustrated) are subdivided into n signal blocks in matching relation with the blocks of the loops. From a time $A_1$ just after a change of the scanning direction to a time $B_1$, a butst appears sequentially in each of the n signal blocks.

From the time $B_1$ to a time C, one burst appears in each signal block, i.e., a first block comprising signals $x_{11}$ to $x_{1m}$, a second block comprising signals $x_{21}$ to $x_{2m}$, or a n-th block comprising signals $x_{n1}$ to $x_{nm}$, thereby scanning the respective blocks of the loop at a time. A counter 98 included in the coordinate delivery circuit is applied with scanning timing pulses which rise every time the scanning mentioned above begins, e.g., times $A_1, A_2, \ldots, A_n, B_1, B_2$ or $B_{s-1}$ and $B_s$. The counter 98, counting the timing pulses, delivers an operation start command to a peak detector 99 when the count indicates the scanning period between the times $A_1$ and $B_1$, while delivering a high level signal to an AND gate 100 when the count indicates a predetermined coordinate detection period. The output of the counter 98 indicative of a count is routed to a gate 101.

When the pen 5 is manipulated to input information, the peak detector 99 is first activated from the times $A_1$ to the time $B_1$ so as to detect a peak of the detected signal output from the demodulator 12 and generate a pulse which rises at the peak. The gate 101, to which the pulse from the peak detector is applied, routes a signal output from the counter 98 and indicative of a count to a multiplexer 102 and a coordinate generator circuit 103 upon the rise of the pulse output from the peak detector 99. The output of the counter indicative of a count shows a particular block of a loop group in which the pen position lies. Comprising an analog multiplexer, the multiplexer 102 receives from the controller 4 a timing signal group consisting of signals indicative of reference points of the respective blocks. In response to the signal gated by the gate 101 and indicative of a count, the multiplexer 102 selects one of the group of timing signals which indicates the reference point of the particular block associated with the input point, and couples it to a counter 104. The coordinate generator 103, responsive to the output of the gate 101 indicative of a count, generates a digital signal representative of a coordinate of the reference point of the above-mentioned particular block and delivers it to one input terminal of an adder 105.

For the period between the times $B_1$ and C, on the other hand, the two filters 94a and 94b (see FIG. 12) which are alternately selected by the switching signal from the controller 4 seprates a fundamental harmonic of a detected signal which is output from the demodulator 17. The phase detector 92 generates a phase signal indicative of a phase of the fundamental harmonic and applies it to the AND gate 100. During a coordinate detection period, the signal fed from the counter 98 to the AND gate 100 remains high level so that the phase signal for that period is passed through the AND gate to the counter 104.

Meanwhile, the pulse rise time of the timing signal is so set as to precede by a predetermined period of time a time tR which is associated with the beginning of the block in which the input point lies; it may be the time $B_{s-1}$, for example. Should the time tR be selected as the rise time of a pulse of the timing signal, the probability of failing to follow the input point would increase when the input point is shifted in the vicinity of the beginning of the block and, as a result, detection of the block associated with the input point might fail. In contrast, by using the timing signal which rises at a time which precedes the time tR as described, erroneous block detection is eliminated. The counter 104, supplied with the timing signal and the phase signal which is passed through the AND gate 100, counts up coordinate measuring clock pulses from the controller 4 over the period from the pulse rise time $B_{s-1}$ of the timing signal to the pulse rise time tX of the phase signal. The counter 104 applies a digital signal indicative of the count to the other input terminal of the adder 105. The adder 105 sums the two digital inputs to produces a digital coordinate signal indicative of a result of the summation. The digital signal output from the coordinate generator 103 shows the coordinate of the reference point of the block associated with the input point, while the digital signal output from the counter 104 shows the coordinate of the input point with respect to the reference point of the block. Hence, the coordinate signal resulting from their summation indicates a coordinate of the input point.

As described above, by subdividing a loop group on an input surface into a plurality of blocks and scanning the respective blocks at a time after detecting a particular block associated with an input point, it is possible to shorten the period of time necessary for scanning and enhance the accuracy of phase detection.

Figure 18:
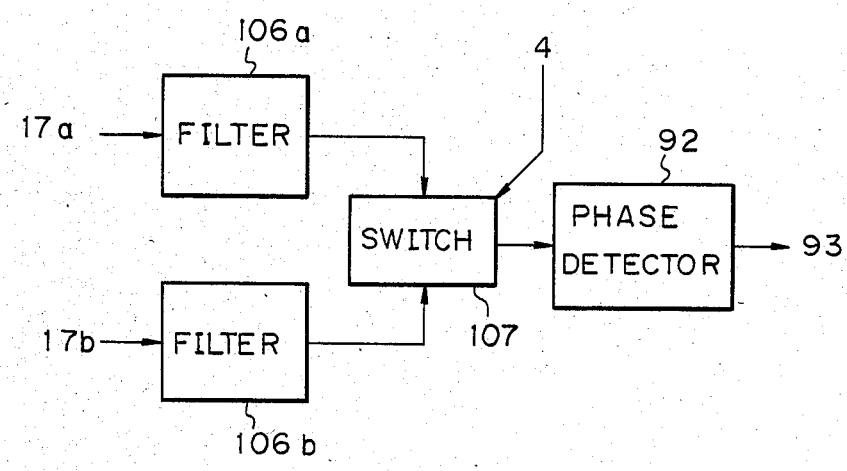
FIG. 18 is a block diagram of a seventh embodiment of the present invention.

Referring to FIG. 18, a seventh embodiment of the present invention includes a coordinate detector circuit which comprises filters 106a and 106b applied respectively with outputs of the demodulators 17a and 17b of the third embodiment, a switch 107, a phase detector 92, and a coordinate delivery circuit 93 (not shown). The filters 106a and 106b separate fundamental harmonic components from detected signals output from the demodulators 17a and 17b, respectively, and apply them to the switch 107. Timed to a switching signal output from a controller 4, the switch 107 alternately selects outputs of the filters 106a and 106b to apply them to the phase detector 92. Further, a phase signal output from the phase detector 92 is applied to the coordinate delivery circuit 93. In this particular embodiment, it is necessary to apply the outputs of the demodulators 17a and 17b to the filters 106a and 106b, respectively, while switching them from one to the other. Therefore, to eliminate error in coordinate detection, a waiting time long enough for a transitional phenomenon at the time of switching to be sufficiently damped needs is required.

Figure 19:
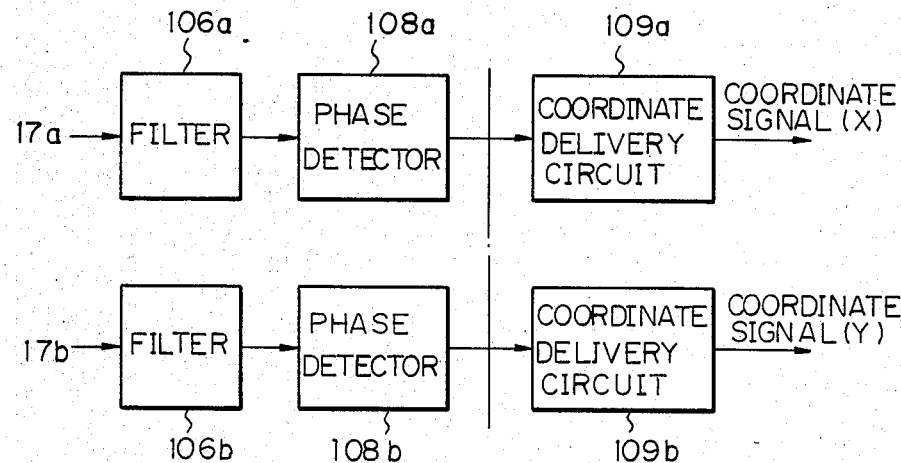
FIG. 19 is a block diagram of an eighth embodiment of the present invention.

Referring to FIG. 19, an eighth embodiment of the present invention includes a coordinate detector circuit which comprises filters 106a and 106b associated respectively with the outputs of the demodulators 17a and 17b of the third embodiment, phase detectors 108a and 108b, and coordinate delivery circuits 109a and 109b. Phase signals output from the phase detectors 108a and 108b are applied respectively to the independent coordinate delivery circuits 109a and 109b which then generate respectively an X coordinate signal and a Y coodinate signal. Such a construction eliminates the need for switching the filters 106a and 106b and attains a further increase in the frequency of coordinate detection per unit time over the embodiment, thereby further speeding up the coordinate detection.

Figure 20:
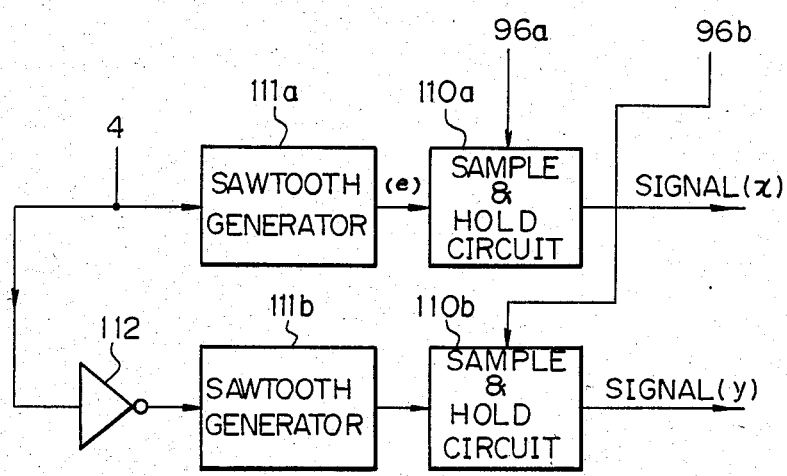
FIG. 20 is a block diagram of a ninth embodiment of the present invention.

Referring to FIG. 20, a ninth embodiment of the present invention is shown which comprises, in addition to various elements of the fifth embodiment, sample and hold circuits 110a and 110b associated respectively with the outputs of the phase detectors 96a and 96b of the fifth embodiment, sawtooth generators 111a and 111b, and an inverter 112. The operation of the ninth embodiment will hereinafter be described referring to FIG. 21 as well.

A control circuit 4 applies a switching signal to the switch 95a and a reference signal to the sawtooth generator 111a and inverter 112. The reference signal is produced by advancing the phase of the switching signal by 90 degrees. The demodulator 17 generates a signal (a) which is fed to the switch 95a. When the switching signal is high level (e.g. between times $t_1$ and $t_2$), that is, while X coordinate scanning is under way on the tablet 1, the switch 95a routes the signal (a) to the filter 94a; when the switching signal is low level (e.g. between times $t_2$ and $t_3$), that is, while Y coordinate scanning is under way, it couples the signal (a) to the filter 94b. The filter 94a separates a fundamental harmonic component from the signal (b) output from the switch 95a and passes therethrough a sinusoidal signal (c) to the phase detector 96a. The phase detector 96a generates a pulse which rises when the signal (c) crosses zero while varying from the negative toward the positive (e.g. $t_5$ or $t_6$), delivering it as a signal (d) to the sample and hold circuit 96a.

Meanwhile, the sawtooth generator 111a generates a sawtooth wave whose voltage increases linearly from the rise time (e.g. time $t_o$) over to the fall time of a pulse of the reference signal. The sawtooth signal is fed to the sample and hold circuit 110a as a signal (e). The sample and hold circuit 110a samples and holds voltages of the signal (e) (e.g. voltages $v_5$ and $v_6$) at the rise of the signal (d) (e.g. times $t_5$ and $t_6$), sending them as a signal (x). The signal (c) appears as a sinusoidal voltage signal which reaches a peak substantially upon the rise of the signal (b), and it remains substantially proportional to the X coordinate of the input point from the instant when the pulse of the reference signal has risen to the instant when the voltage of the signal (c) crosses zero from the negative toward the positive. Hence, the voltage of the signal (x) is proportional in magnitude to the X coordinate of the input point.

While the process terminating with the generation and delivery of the signal (x) has been described using the filter 94a and its subsequent elements, it will be noted that the process up to the generation and delivery of a signal (y) indicative of a Y coordinate is analogous to the process associated with the signal (x) and, therefore, description thereof will be omitted for simplicity.

As described, this particular embodiment is constructed to generate and deliver analog signals (x) and (y) each having a voltage proportional to the phase of an induced voltage of the winding. Since both the signals (x) and (y) are analog, they may be transmitted over a long distance (e.g. several tens of meters) using an odinary line and the device attains compatibility with another analog type graphic input device. In addition, this embodiment, due to the use of a system wherein the sample and hold circuits 110a and 110b sample and hold sawtooth voltages, achieves coordinate signals (i.e. (x) and (y)) which involve little rippling, and features desirable following ability as well a a high conversion efficiency.

Figure 22:
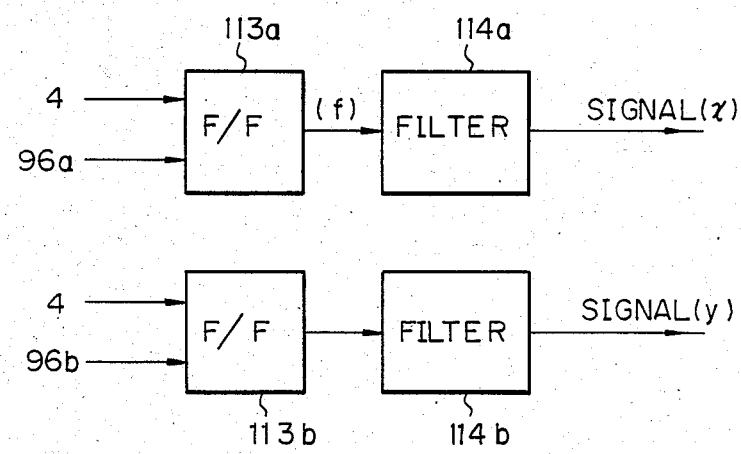
FIG. 22 is a block diagram of a tenth embodiment of the present invention.
Figure 21:
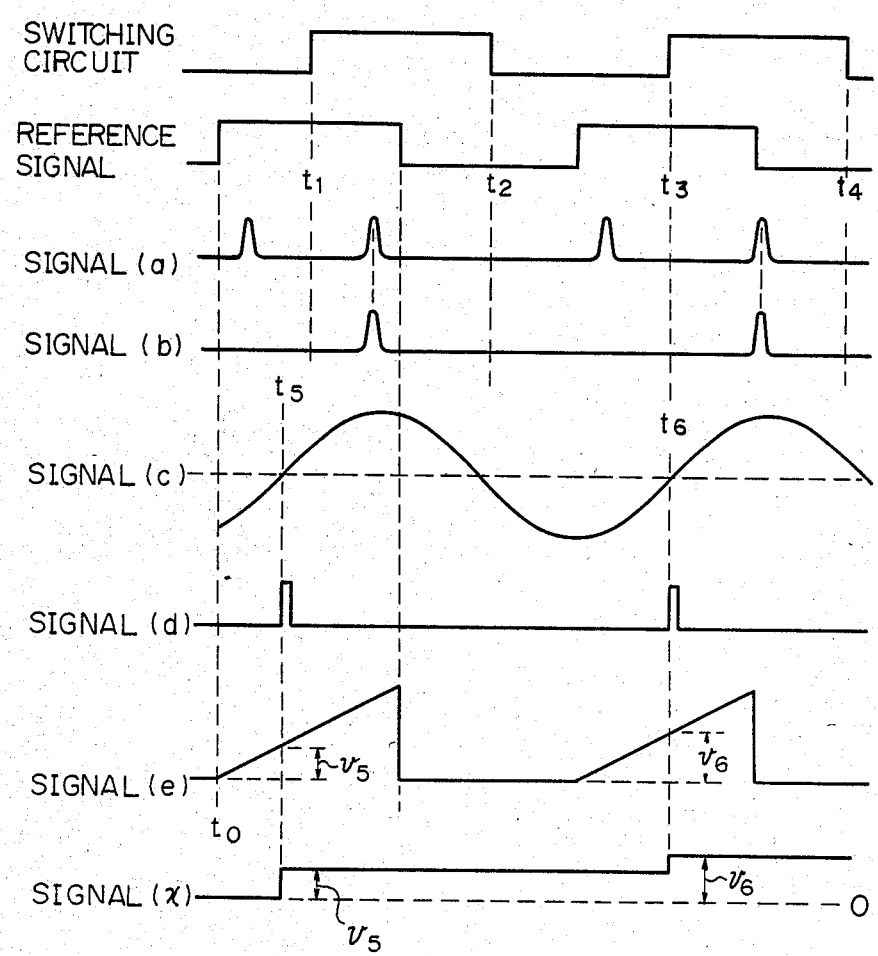
FIG. 21 shows waveforms demonstrating the operation of the ninth embodiment of FIG. 20.

Referring to FIG. 22, a tenth embodiment of the present invention comprises, in addition to the elements of the fifth embodiment, flip-flops (FF) 113a and 113b connected respectively to the outputs of the phase detectors 96a and 96b of the fifth embodiment, and filters 114a and 114b. The operation of such a device will be described with reference to FIG. 23.

The controller 4 generates reference signals (1) and (2) which commonly rise when the reference signal in accordance with the ninth embodiment rises and falls and indicate reference points of the respective coordinates when they rise. The switch 95a, filters 94a and 94b, and phase detectors 96a and 96b operate in the same manner as in the ninth embodiment. A signal (d) output from the phase detector 96a is applied to a reset terminal R of the FF 113a. Applied to a set terminal S of the FF 113a is the reference signal (1). The FF 113a generates a signal (f) which rises upon the rise of the reference signal (1) and, then, falls upon the rise of the signal (d), delivering the signal (f) to the filter 114a. Comprising a low pass filter, the filter 114a separates a low frequency component close to direct current contained in the signal (f) and delivers it as a signal (x).

Since each pulse of the signal (f) has a duration proportional to an X coordinate of an input point, the voltage of the low frequency component is also proportional to the X coordinate of the input point. Hence, a voltage of the signal (x) is proportional to an X coordinate of an input point.

Likewise, the FF 113b and filter 114b respond to the reference signal (2) and a signal output from the phase detector 96b by generating a signal (y) whose voltage is proportional to a Y coordinate of an input point.

Figure 24:
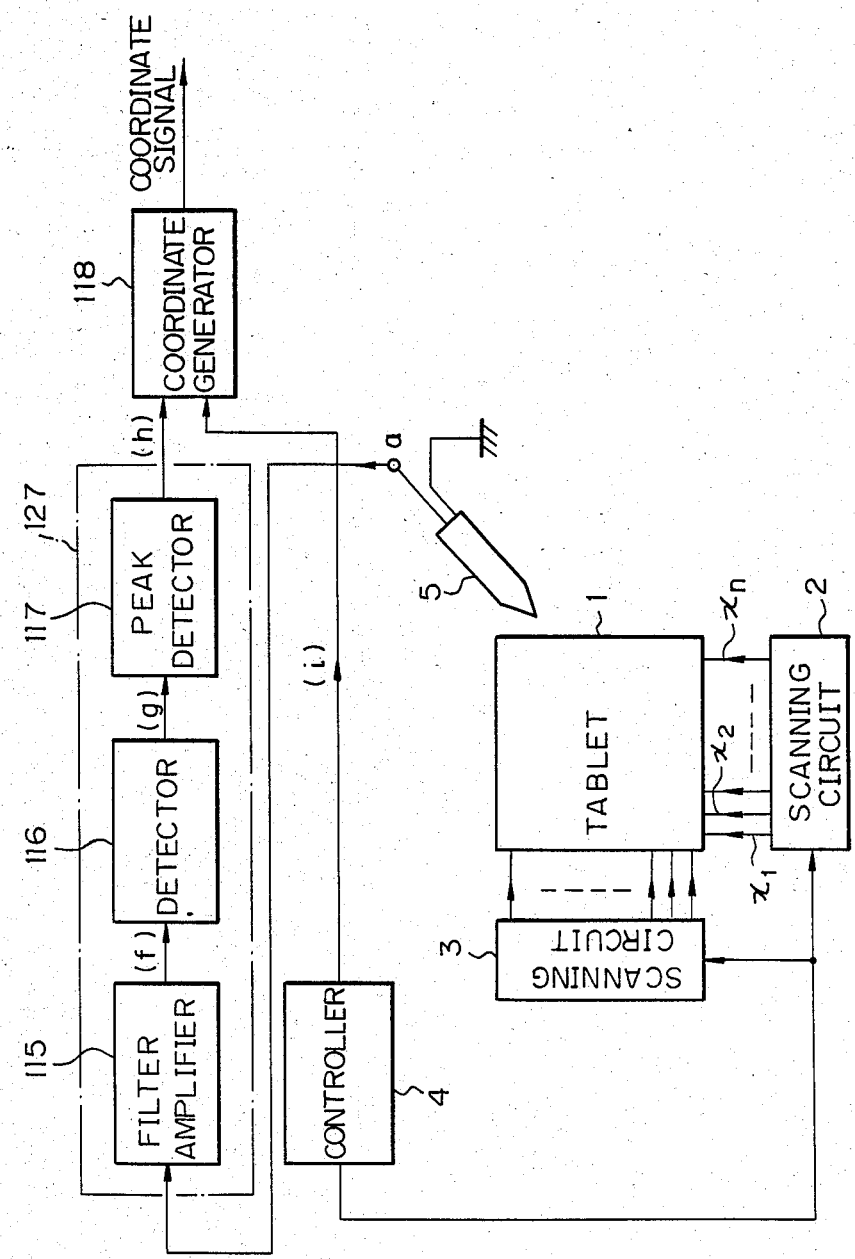
FIG. 24 is a block diagram of an eleventh embodiment of the present invention.
Figure 25:
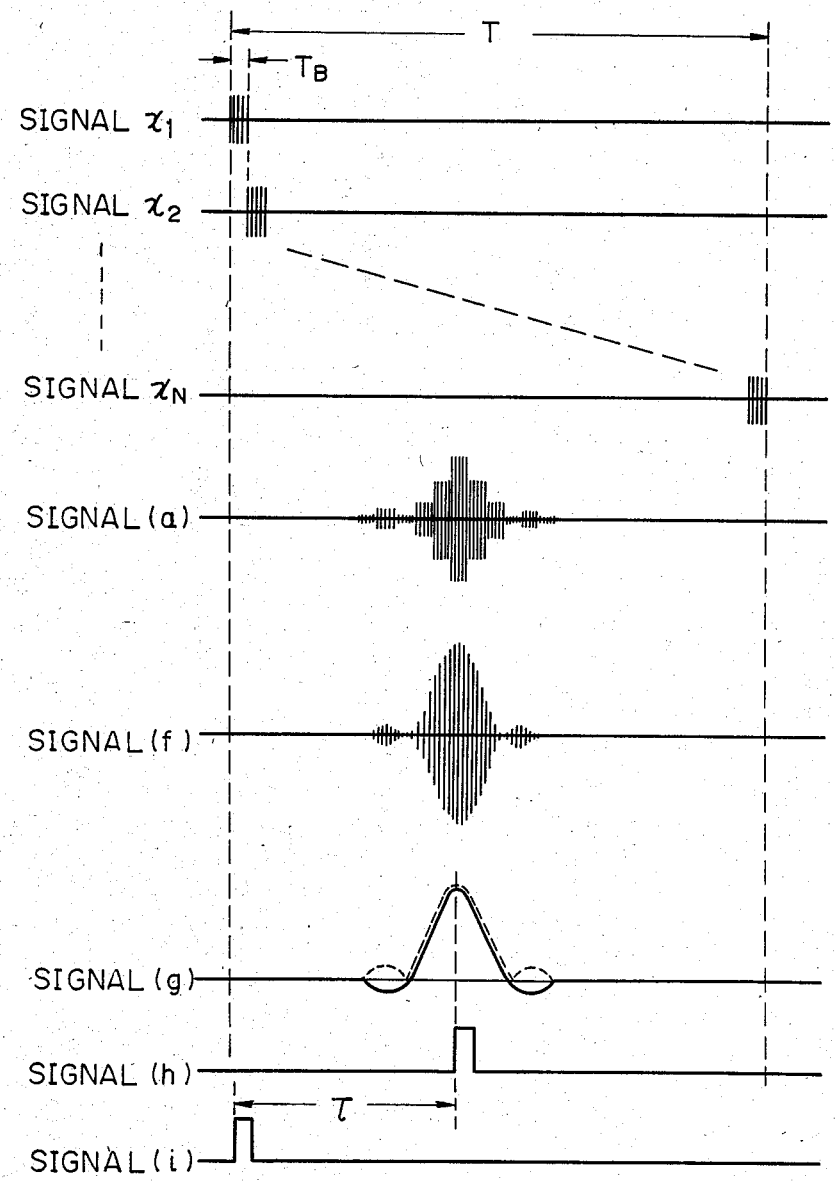
FIG. 25 shows waveforms demonstrating the operation of the eleventh embodiment of FIG. 24.

Referring to FIG. 24, an eleventh embodiment of the present invention is shown in a block diagram. FIG. 25 is a timing chart demonstrating the operation of this particular embodiment. Propagating magnetic fields in the X coordinate axis and Y coordinate axis directions develop alternately on the input surface of the tablet 1 in response to a switching signal output from the controller 4. A signal (a) induced in the winding in the pen 5 upon entry of information is applied to a detector circut 127. The detector circuit 127 includes a filter amplifier 115 adapted to remove high frequency components of side bands the signal (a) so as to smooth the steplike envelope of the signal (a). The resulting signal, (f), having a smooth envelope is fed to a detector 116. Assuming that the carrier frequency is $F_o$ and the scanning frequency of the scanning circuits is $F_b$ (let $T_b$ be the scanning time assigned to each of the signals $x_1$ to $x_n$, or burst length, and the scanning frequency, $F_b$ be $1/T_b$), the abovementioned signal (f) with a smooth envelope is attainable if the filtering characteristic of the filter amplifier 115 is selected such that components in the frequency band lower than $(F_o-F_b)$ and those in the frequency band higher than $(F_o+F_b)$ are sufficiently attenuated.

The detector 116 detects the signal (f) and delivers the detected signal, (g), to a peak detector 117. Where the detector 116 comprises a synchronous detector, the signal (g) has such a voltage waveform as one indicated by a solid line in FIG. 25 and, where it comprises an envelope detector, such a volage waveform as one indicated by a dotted line. In any case, the peak detector 117 generates a signal (h) which rises in response to a peak of the signal (g). The signal (h) is applied to a coordinate generator 118. The coordinate generator 118 generates a digital signal having a value proportional to an interval $\tau$ between a pulse of a signal (i) which is output from the controller 4 and rises at a timing corresponding to the origin of each coordinate and the signal (h), delivering the digital signal as a coordinate signal.

Figure 26A:
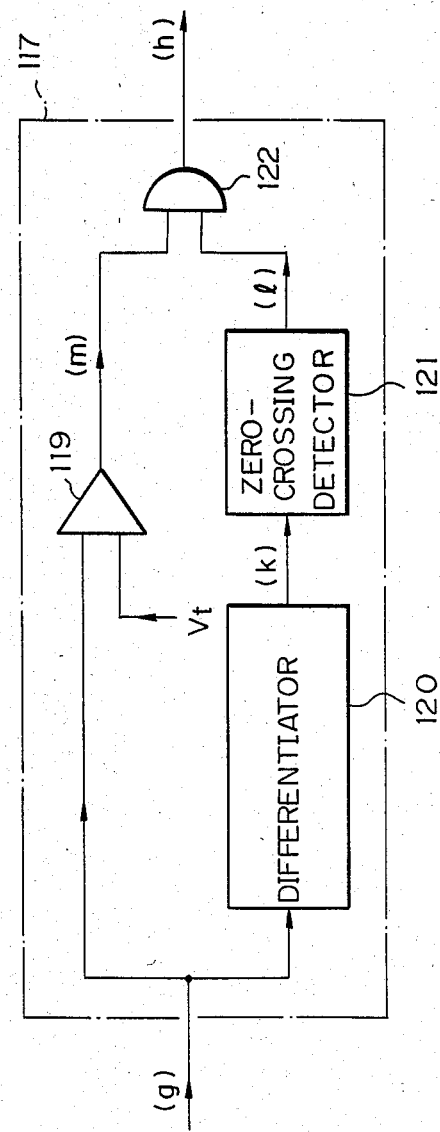
FIGS. 26A and 26B show a peak detector circuit in a block diagram together with waveforms which represent its operation.
Figure 26B:
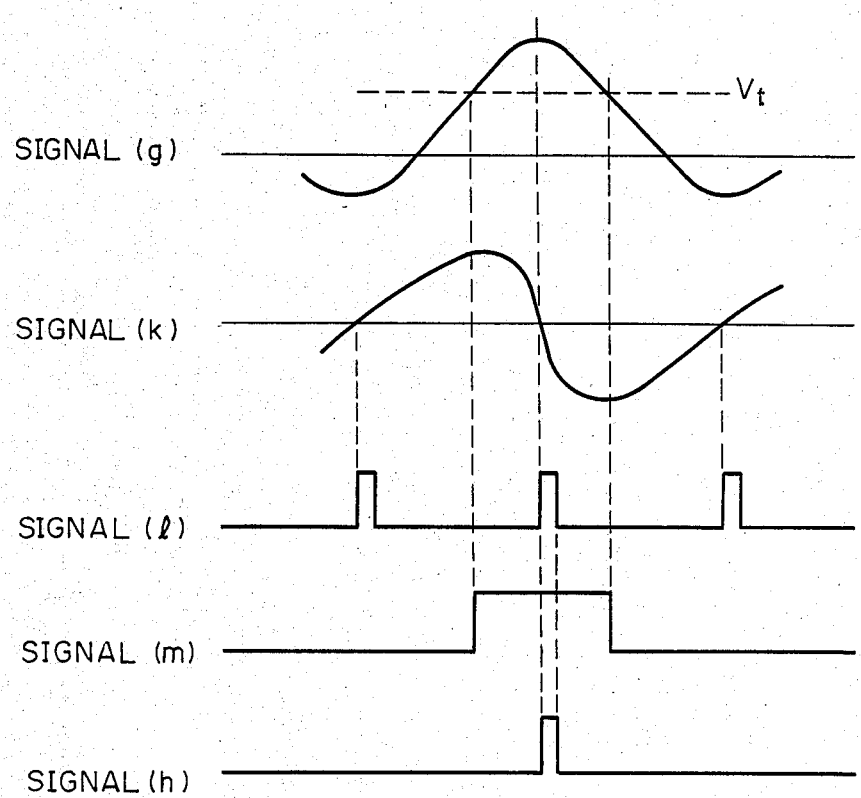

Referring to FIGS. 26A and 26B, an exemplary construction and operation of the peak detector 117 discussed above is shown. The detected signal (g) is applied to an amplitude comparator 119 and a differentiator 120. The differentiator 120 differentiates the waveform of the signal (g) to produce a signal (k) which is then fed to a zero-crossing detector 121. The zero-crossing detector 121 generates a signal (l) which rises every time the waveform of the signal (k) reaches zero level, the signal (l) being fed to one input terminal of an AND gate 122.

The amplitude comparator 119, on the other hand, generates a signal (m) which rises only when the voltage of the signal (g) becomes higher than a predetermined threshold voltage V. The signal (m) is routed to the other input of the AND gate 122. The AND gate 122 produces a signal (h) which is the AND of the signals (l) and (m). The differentiated value of the signal (g) becomes zero at some points other than the peaks even in a noiseless condition, and when externally derived noise is added, the differentiated value would become zero even at the peaks of the noise in those portions of the signal (g) where the voltage is relatively low. All such occurrences constitute a cause of erroneous peak detection. The construction shown in FIG. 26A successfully solves this problem by delivering only those pulses of the signal (l) which appear while the signal (g) is higher than the threshold level $V_t$.

Figure 27:
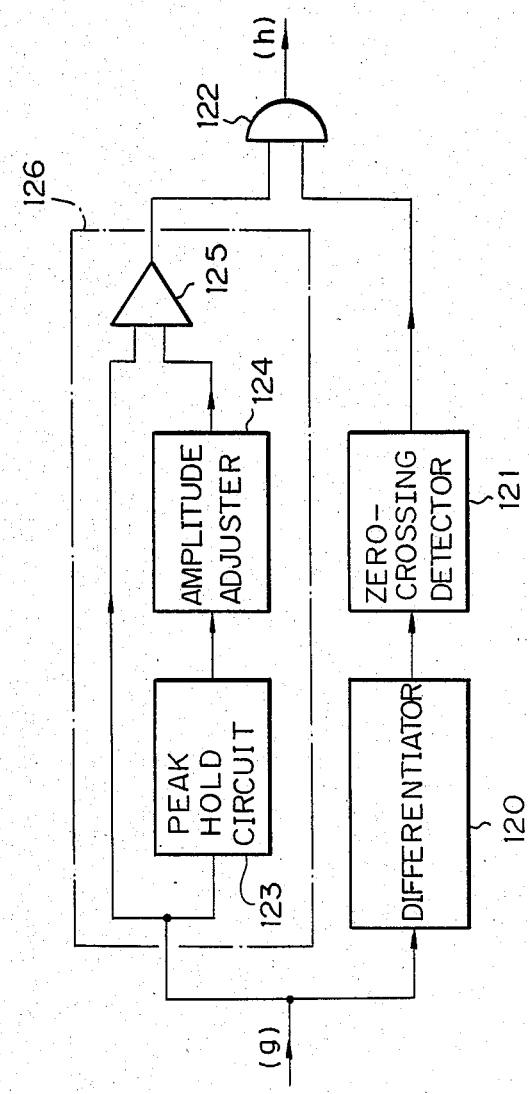
FIG. 27 is a block diagram of an alternative peak detector circuit.

An alternative construction of the peak detector 117 in this particular embodiment is shown in FIG. 27. The peak detector 117 in FIG. 27 uses, in place of the amplitude comparator 119 shown in FIG. 26A, a comparator 126 having a threshold voltage level which is variable in response to a peak of the signal (g). Specifically, the amplitude comparator 125 is supplied with a threshold voltage which is developed by routing the signal (g) through a peak hold circuit 123 and an amplitude adjuster 124, instead of the predetermined threshold voltage $V_t$. The threshold voltage is a constant multiple of a peak voltage of the signal (g); the amplitude comparator 125 generates a signal which rises only when the volage of the sigal (g) rises beyond the theshold voltage. Therefore, only if a suitable ratio is set up in advance between the threshold voltage and the peak voltage of the signal (g) by means of the amplitude adjuster 124, peaks of the signal (g) can be detected with accuracy despite any fluctuation of the peak voltage of the signal (g).

Figure 28:
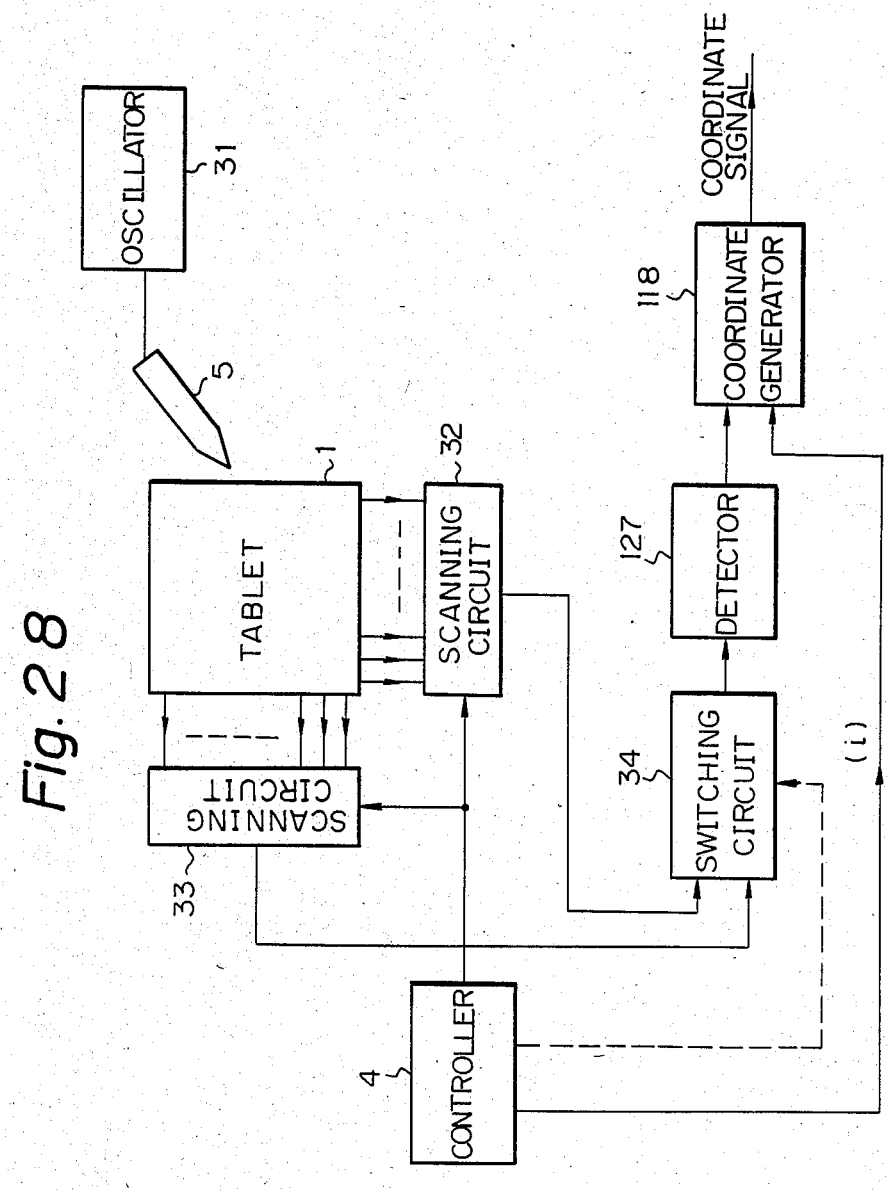
FIG. 28 is a block diagram of a twelfth embodiment of the present invention.

Referring to FIG. 28, a twelfth embodiment of the present invention is shown. As shown, carrier current generated by the oscillator 31 is caused to flow through the winding (not shown) of the pen 5 so as to develop an alternating magnetic field. During an input operation, voltages induced in the respective loops (not shown) of the tablet 1 are sequentially scanned to detect coordinates of an input point. The scanning circuits 32 and 33 sequentially scan the induced voltages in the tablet loops to deliver them to the switching circuit 34. In response to a switching signal output from the controller 4, the switching circuit 34 alternately gates the two signals from the scanning circuits 32 and 33 to the detector 127. The coordinate generator 118 generates a digital signal proportional to an interval between a pulse (i) associated with the origin of each coordinate and output from the controller 4 and a pulse output from the detector 127, delivering the digital signal as a coordinate signal. The detector 127 is identical in construction with that of the preceding embodiment.

It will be noted that the switching circuit 34 in FIG. 28 is omissible if individual detectors are associated with the scanners 32 and 33.

Various modifications will become possible for those skilled in the art after receiving the teachings of the present disclosure without departing from the scope thereof.

What is claimed is:

1. A graphic input device for converting a pattern entered by hand to an electric signal, comprising:
   drive means for generating a drive signal by modulating a multi-phase signal by a carrier signal;
   a tablet having an input surface in which a plurality of conductive loops are arranged to generate in response to the drive signal a magnetic field which propagates along a coordinate axis;
   a pen for entering the pattern having a winding which is mounted in said pen at a predetermined height above a tip of the pen, said winding being interlinked with said magnetic field to generate a voltage signal when the pattern is entered into the input surface of the tablet;

demodulator means for generating a demodulated signal by synchronously detecting said voltage signal by means of a carrier signal for demodulation which is synchronous in phase with the carrier signal contained in the voltage signal and, then, clipping the detected voltage signal at a predetermined voltage level; and coordinate detector means for generating a coordinate signal indicative of an input coordinate where the pen is positioned in response to a fundamental harmonic component of said demodulated signal.

2. A graphic input device for converting a pattern entered by hand to an electric signal, comprising:

oscillator means for generating a carrier;

a pen for entering the pattern having a winding which is mounted in said pen at a predetermined height above a tip of the pen, said winding developing a magnetic field in response to the carrier;

a tablet having an input surface in which a plurality of conductive loops are arranged, each of said conductive loops being interlinked with the magnetic field to generate a voltage signal during an input operation;

scanning means for generating a scanned signal by sequentially scanning the voltage signals generated by said conductive loops;

demodulator means for generating a demodulated signal by synchronously detecting said scanned signal by a carrier for demodulation which is synchronous in phase with the carrier contained in said scanned signal and, then, clipping said detected signal at a predetermined voltage level; and coordinate detector means for generating a coordinate signal indicative of an input coordinate where the pen is positioned in response to a fundamental harmonic component of the demodulated signal.

3. A graphic input device for converting pattern entered by hand to an electric signal, comprising:

a tablet having an input surface in which a first group of a plurality of conductive loops and a second group of a plurality of conductive loops are arranged in a first coordinate direction and a second coordinate direction, respectively;

a pen for entering the pattern having a winding which electromagnetically couples wtih said first and second groups of loops in said input surface during an input operation;

input means having scanning circuits for scanning respectively the first and second groups of loops each with a predetermined period;

a first filter for filtering a first electric signal indicative of a point of electromagnetic coupling of the first groups of loops and the winding;

a second filter for filtering a second electric signal indicative of a point of electromagnetic coupling of the second group of loops and the winding;

at least one switch for alternately selecting two terminals of at least one of a set of input terminals, and a set of output terminals of the first and second filters in response to a switching signal which is synchronous with said scanning period; and detector means having a coordinate detector circuit for generating a third electric signal indicative of an input coordinate where the pen is positioned in response to the first and second electric signals which are filtered respectively by the first and second filters alternately selected by the switch.

4. A graphic input device as claimed in claim 3, in which the switching signal has a period equal to a period of time which causes the respective loops of one of the first and second groups to be scanned a plurality of times in a predetermined sequence, the ordinate detector circuit being constructed to generate the third electric signal in response to a filtered signal output from one of the first and second filters which is selected by the switch within a predetermined period of time for every period of the switching signal.

5. A graphic input device as claimed in claim 3, in which the switching signal has a period equal to a period of time which causes respective loops of one of the first and second groups to be scanned once in a predetermined sequence, the coordinate detector circuit being constructed to generate the third electric signal in response to a filtered signal which is output from one of the first and second filters selected by the switch for every period of the switching signal.

6. A graphic input device for converting a pattern entered by hand to an electric signal, comprising:

a tablet having an input surface in which a first loop group and a second loop group each comprising a plurality of conductive loops are arranged in first and second coordinate directions, respectively;

a pen for entering the pattern having a winding which electromagnetically couples with the first and second loop groups in said input surface during an input operation;

input means having scanning circuits for scanning respectively the first and second loop groups each at a predetermined period;

a first filter for filtering a first electric signal indicative of a point of electromagnetic coupling of the first loop group and the winding;

a second filter for filtering a second electric signal indicative of electromagnetic coupling of the second loop group and the winding; and detector means having a coordinate detector circuit for generating a third electric signal indicative of input coordinates where the pen is positioned in response to the first and second electric signals which are filtered by the first and second filters, respectively.

7. A graphic input device for converting a pattern entered by hand to an electric signal, comprising:

a tablet for graphic input;

coordinate detector means for generating a first signal in a phase which indicates a reference point of a coordinate on an input surface of said tablet, and a second signal different in phase from said first electric signal by an amount substantially proportional to a coordinate distance between said reference point and an input position on the input surface; and coordinate signal generator means for generating an analog signal of a voltage substantially proportional to said phase difference between said first and second signals in response to the first and second signals.

8. A graphic input device as claimed in claim 7, in which the coordinate signal generator means comprises a sawtooth generator for generating a third electric signal which begins to rise when the phase of the first electric signal indicates the reference point and is proportional to a time which lapses thereafter, and a sample and hold circuit for sampling and holding a voltage of said third electric signal when the phase of the secon signal indicates the coordinate detection timing and delivering said voltage as said analog signal.

9. A graphic input device as claimed in claim 7, in which the coordinate signal generator means comprises a flip-flop which is set when a phase of the first electric signal indicates said reference point and reset when the phase of the second electric signal indicates said coordinate detection timing, and a low pass filter for separating a low frequency component from an output signal of said flip-flop and delivering said low frequency component as said analog signal.

10. A graphic input device for converting a pattern entered by hand to an electric signal, comprising:
- a tablet for developing a magnetic field propagating along a coordinate axis on an input surface of said tablet in response to a scanning signal which is modulated by a carrier to alternately scan two groups of conductive loops arranged in the input surface;
- a pen having a winding therein which is interlinked with said magnetic field upon entry of the pattern into said input surface so as to induce a first electric signal;
- filter amplifier means for passing and amplifying a component of said first electric signal which lies in a predetermined bandwidth inclusive of a frequency of said carrier;
- detector means for detecting said filtered and amplified electric signal;
- peak detector means for detecting a peak of a waveform of said detected electric signal to generate a second electric signal indicative of a time of detection of said peak, whereby a coordinate signal indicative of a coordinate of the input point is delivered in response to a lag between a pulse signal indicative of a time associated with an origin of the coordinate and said second electric signal.

11. A graphic input device as claimed in claim 10, in which the pass bandwidth of the filter amplifier means is smaller than double the scanning frequency in the loop groups.

12. A graphic input device as claimed in claim 10, in which the detector means comprises an envelope detector.

13. A graphic input device as claimed in claim 10, in which the detector means comprises a synchronous detector.

14. A graphic input device as claimed in claim 10, in which the peak detector means is constructed to generate the second electric signal by differentiating the waveform of the detected signal and, then, detecting a zero-crossing point of said differentiated signal.

15. A graphic input device as claimed in claim 14, in which the peak detector means is constructed to detect the zero-crossing point only when the detected signal exceeds a predetermined threshold voltage.

16. A graphic input device as claimed in claim 14, in which the peak detector means is constructed to detect the zero-crossing point only when the detected signal exceeds a threshold voltage which depends on a peak of the waveform of the detected signal.

17. A graphic input device for converting a pattern entered by hand to an electric signal, comprising:
- a pen having a winding therein which develops a magnetic field in response to a carrier applied thereto;
- a tablet having an input surface in which two groups of conductive loops are arranged, said tablet, when the pattern is entered into the input surface, alternately scanning electric signals which are induced in the respective loop groups in response to the magnetic field and, thereby, generating a first electric signal;
- filter amplifier means for passing and amplifying a component of said first electric signal which lies in a predetermined bandwidth inclusive of a frequency of the carrier;
- detector means for detecting said filtered and amplified electric signal; and
- peak detector means for detecting a peak of the waveform of said detected electric signal to generate a second electric signal which indicates a time of detection of the peak, whereby a coordinate signal indicative of a coordinate of the input point is generated in response to a difference in time between a pulse signal indicative of a time associated with an origin of the coordinate and the second electric signal.

18. A graphic input device as claimed in claim 17, in which the pass band of the filter amplifier means is smaller than double the scanning frequency in the loop groups.

19. A graphic input device as claimed in claim 17, in which the detector means comprises an envelope detector.

20. A graphic input device as claimed in claim 17, in which the detector means comprises a synchronous detector.

21. A graphic input device as claimed in claim 17, in which the peak detector means is constructed to generate the second electric signal by differentiating the waveform of the detected electric signal and, then, detecting a zero-crossing point of the differentiated signal.

22. A graphic input device as claimed in claim 21, in which the peak detector means is constructed to detect the zero-crossing point only when the detected electric signal exceeds a predetermined threshold voltage.

23. A graphic input device as claimed in claim 21, in which the peak detector means is constructed to detect the zero-crossing point only when the detected electric signal exceeds a threshold voltage which depends on a peak of the waveform of the detectd electric signal.

* * * * *